United States Patent
Kang et al.

(10) Patent No.: US 12,541,376 B1
(45) Date of Patent: Feb. 3, 2026

(54) SYSTEM AND METHOD FOR AUTOMATED PROXY AUTOCONFIGURATION FILES

(71) Applicant: Morgan Stanley Services Group Inc., New York, NY (US)

(72) Inventors: Sumin Kang, Singapore (SG); Yubo Bai, Singapore (SG); Tsz Wai Ng, Kowloon (HK); Wing Kwan Chu, Kowloon (HK); King Chi Wong, Kowloon (HK); Clement Seah, Singapore (SG); Li Yu Sandra Wong, Singapore (SG); Wei Ming Law, Singapore (SG); Hui Liu, Singapore (SG)

(73) Assignee: Morgan Stanley Services Group Inc., New York, NY (US)

( * ) Notice: Subject to any disclaimer, the term of this patent is extended or adjusted under 35 U.S.C. 154(b) by 0 days.

(21) Appl. No.: 19/060,157

(22) Filed: Feb. 21, 2025

(51) Int. Cl.
*G06F 9/445* (2018.01)

(52) U.S. Cl.
CPC ................................ *G06F 9/44505* (2013.01)

(58) Field of Classification Search
None
See application file for complete search history.

(56) References Cited

U.S. PATENT DOCUMENTS

| | | | |
|---|---|---|---|
| 6,892,235 B1 | 5/2005 | Daude et al. | |
| 8,166,141 B1 | 4/2012 | Van Horne, III | |
| 8,527,631 B1 * | 9/2013 | Liang | G06Q 10/0639 709/225 |
| 9,077,688 B2 | 7/2015 | Amit et al. | |
| 9,207,953 B1 | 12/2015 | Shokhor | |
| 10,089,292 B2 * | 10/2018 | Shetty | G06F 3/0481 |
| 11,093,267 B2 | 8/2021 | Singh | |
| 2003/0187925 A1 * | 10/2003 | Inala | G06F 21/41 709/204 |
| 2004/0006615 A1 | 1/2004 | Jackson | |
| 2006/0031757 A9 * | 2/2006 | Vincent, III | G06F 3/04812 715/275 |
| 2010/0174974 A1 * | 7/2010 | Brisebois | G06Q 10/00 715/780 |
| 2011/0265188 A1 * | 10/2011 | Ramaswamy | G06F 21/31 715/764 |
| 2012/0023435 A1 * | 1/2012 | Kneppers | G06Q 90/00 715/780 |
| 2012/0317144 A1 * | 12/2012 | Menezes | G06F 16/21 707/E17.014 |
| 2013/0055060 A1 * | 2/2013 | Folsom | G06F 40/143 715/222 |
| 2014/0053237 A1 * | 2/2014 | Hopen | H04L 63/029 726/1 |

(Continued)

OTHER PUBLICATIONS

Carter, "RBAC vs ABAC Access Control Models," Jan. 19, 2017, https://blog.identityautomation.com/rbac-vs-abac-access-control-models-iam-explained.*

*Primary Examiner* — Ryan Barrett
(74) *Attorney, Agent, or Firm* — PEARL COHEN ZEDEK LATZER BARATZ LLP

(57) ABSTRACT

Systems and methods for automatically creating, updating and validating proxy autoconfiguration (PAC) files. The systems and method can include creating and/or updating the PAC files based on a PAC template, PAC proxysets, and/or PAC rules. The PAC files can be automatically validated and deployed.

14 Claims, 22 Drawing Sheets

(56) References Cited

U.S. PATENT DOCUMENTS

| | | | |
|---|---|---|---|
| 2014/0279640 A1* | 9/2014 | Moreno | G06Q 50/265 |
| | | | 705/325 |
| 2019/0036777 A1* | 1/2019 | Frizzell | H04L 61/457 |
| 2019/0079752 A1* | 3/2019 | Makkar | G06F 8/36 |
| 2019/0303272 A1* | 10/2019 | Sadykov | G06F 40/186 |
| 2019/0386961 A1 | 12/2019 | Kupisiewicz et al. | |
| 2020/0169535 A1* | 5/2020 | Chaubey | H04L 41/0806 |
| 2020/0228540 A1 | 7/2020 | Hinkle et al. | |
| 2021/0344739 A1* | 11/2021 | Kalva | H04L 67/02 |
| 2022/0103525 A1 | 3/2022 | Shribman et al. | |
| 2022/0103526 A1 | 3/2022 | Niemi et al. | |
| 2022/0103527 A1 | 3/2022 | Niemi et al. | |
| 2022/0103647 A1 | 3/2022 | Huston, III | |
| 2023/0274082 A1* | 8/2023 | Afzal | G06F 3/048 |
| | | | 715/223 |
| 2024/0338233 A1* | 10/2024 | Bhamidipati | G06F 16/215 |

\* cited by examiner

Create Template

Template name — 410

Default Proxyset
Select... — 415

Proxysets
Select... — 420

Notes — 425

Ticket Info *(optional)*
ticket id | ticket type — 430

Purpose of creation — 435

Submit

Create Proxyset

Proxyset name

Rulesets
Select...

Proxies
Hostname @ Port
Leave Proxies empty for DIRECT connection (no proxy)
Add new proxy Notes ☐ Ignore Validation Ticket Info *(optional)*
ticket id | ticket type Purpose of creation Submit

FIG. 7

Create Rule

Ruleset
Select... ⌄

☐ Set regex

Type 1020
Select... ⌄

Entity 1025
Select... ⌄

Match 1030
Select... ⌄

Value 1035

Notes 1040

Ownership
group 1045

Ticket Info *(optional)*
ticket id 1050    ticket type

☐ Ignore Validation

Purpose of creation 1055

Submit

| Production | Version | Staging | ~~Inactive Version~~ | History | rs1/include/host/equals/100.100.0.0

Name
Ruleset
[rs1]   1110

Type 1120    Entity 1125    Match 1130    Value 1135
[include ∨]  [host ∨]       [equals ∨]    [100.100.0.0]

Notes
[                    ]   1140

Ownership
Group          Username
[owner_group]  [owner_1]    1145

☐ Ignore Validation

[Reactivate]

FIG. 11

Manage Changes

1200

Templates

| Name | Version | | Default Proxyset | Proxysets | Requester Comments | Decision | Admin Comments |
|---|---|---|---|---|---|---|---|
| tmpl 2 | Deactivate | | ps_3 | ps_2 × \| ps_3 × \| ∨ | | Cancel × \| ∨ | |

Proxysets

| Name | Version | | Rulesets | Proxies | Requester Comments | Decision | Admin Comments |
|---|---|---|---|---|---|---|---|
| ps_4 | New | | rs1 × \| rs2 × \| rs3 × \| ∨ | proxy-new-1.com:8080, proxy-new-2.com:8080 | Business requirement of Team B | Promote × \| ∨ | |

Rule

| Ruleset / Type / Entity / Match / Value | Version | Group | Username | Requester Comments | Decision | Admin Comments |
|---|---|---|---|---|---|---|
| rs1 include host equals 100.100.0.2 | New | owner_group_2 | owner_4 | Business requirement by Team A | Promote × \| ∨ | |

Submit

*From A* rules rule_1 id: r1
rule_set: 'rs1'
rule_group: 'rs1_include_host_equals'
rule: {
  entity: 'host'
  value: '100.100.0.0'
  match: 'equals'
  type: 'include'
}
proxyset_key: 'include_host_equals'
key: 'rs1_include_host_equals__100.100.0.0'
prod: 1 rule_2 id: r2
rule_set: 'rs1'
rule_group: 'rs1_include_host_equals'
rule: {
  entity: 'host'
  value: '100.100.0.1'
  match: 'equals'
  type: 'include'
}
proxyset_key: 'include_host_equals'
key: 'rs1_include_host_equals__100.100.0.1'
prod: 1 rule_3 id: r3
rule_set: 'rs2'
rule_group: 'rs2_include_host_pattern'
rule: {
  entity: 'host'
  value: '/^\.pattern\.test\.com/f'
  match: 'pattern'
  type: 'include'
}
proxyset_key: 'include_host_pattern'
key: 'rs2_include_host_pattern_/^\.pattern\.test\.com/f'
prod: 1 rule_4 id: r4
rule_set: 'rs3'
rule_group: 'rs3_exclude_url_subdomain'
rule: {
  entity: 'url'
  value: 'test-1.subdom.com'
  match: 'subdomain'
  type: 'exclude'
}
proxyset_key: 'exclude_url_subdomain'
key: 'rs3_exclude_url_subdomain__test-1.subdom.com'
prod: 1 rule_5 id: r5
rule_set: 'rs3'
rule_group: 'rs3_exclude_url_subdomain'
rule: {
  entity: 'url'
  value: 'test-2.subdom.com'
  match: 'subdomain'
  type: 'exclude'
}
proxyset_key: 'include_host_subdomain'
key: 'rs3_exclude_url_subdomain__test-1.subdom.com'
prod: 1

1520

```
tmpl_1 proxysets_dict = {
    'ps_1': {
        'include_host_equals': 'rs1_include_host_equals',
        'include_host_pattern': 'rs2_include_host_pattern'
    },
    'ps_2': {
        'include_host_pattern': 'rs2_include_host_pattern',
        'exclude_url_subdomain': 'rs3_exclude_url_subdomain"
    }
} rules_dict = {
    'rs1_include_host_equals': ['100.100.0.0', '100.100.0.1'],
    'rs2_include_host_pattern': ['/.*\.pattern\.test\.com/i'],
    'rs3_exclude_url_subdomain": ['test-1.subdom.com', 'test-2.subdom.com']
} default_proxy_set = 'ps_2'
```

FIG. 16

PAC File 'tmpl_1' header:
```
function ProxySet(args) {
    this.proxies = args.proxies;
    this.include_host_equals = args.include_host_equals;
    this.include_host_subdomain =
        args.include_host_subdomain;
    this.include_host_pattern = args.include_host_pattern;
    ...
    else if(this.hostInSubdomains(host))
        return true;
    else if(this.urlMatchPatterns(url))
        return true;
    else
        return false;
    };
}
```
1715 rule group code block:
```
var rs1_include_host_equals = [
    '100.100.0.0',
    '100.100.0.1'
];
var rs2_include_host_pattern = [
    /^\.pattern\.test\.com/i
];
var rs3_exclude_url_subdomain= [
    'test-1.subdom.com',
    'test-2.subdom.com'
];
```
1720

1710

```
rules_dict = {
    'rs1_include_host_equals': ['100.100.0.0', '100.100.0.1'],
    'rs2_include_host_pattern': [/^\.pattern\.test\.com/i],
    'rs3_exclude_url_subdomain': ['test-1.subdom.com', 'test-2.subdom.com']
}
```
1725

FIG. 17 proxyset code block (1730)
```
var ps_1 = new ProxySet({
    "include_host_equals":        rs1_include_host_equals,
    "include_host_pattern":       rs2_include_host_pattern,
    "proxies":                    ["proxy-1.com:80"]
});
var ps_2 = new ProxySet({
    "include_host_pattern":       rs2_include_host_pattern,
    "exclude_url_subdomain":      rs3_exclude_url_subdomain,
    "proxies":                    ["proxy-2.com:80", "proxy-3.com:80"]
});
var sets = [ps_1, ps_2];
``` footer (1740)
```
function FindProxyForURL(url, host) {
    for (var i in sets){
        var proxySet = sets[i];
        if(proxySet.match(url, host))
            return proxySet.proxyString(url, host);
    }
}
``` default proxyset (1745)
```
return ps_2.proxyString(url, host);
``` proxysets_dict (1735)
```
proxysets_dict = {
    'ps_1': {
        'include_host_equals': 'rs1_include_host_equals',
        'include_host_pattern': 'rs2_include_host_pattern'
    },
    'ps_2': {
        'include_host_pattern': 'rs2_include_host_pattern',
        'exclude_url_subdomain': 'rs3_exclude_url_subdomain'
    }
}
```

(1750)
```
default_proxyset = 'ps_2'
```

FIG. 17 (Cont.)

SYSTEM AND METHOD FOR AUTOMATED PROXY AUTOCONFIGURATION FILES

TECHNICAL FIELD OF THE INVENTION

In general, the invention relates to improving proxy autoconfiguration (PAC) file generation. In particular, to automatically creating and deploying PAC files.

BACKGROUND OF THE INVENTION

Currently, computing systems that serve many users (e.g., computer system of a company or organization) can require proxy autoconfiguration (PAC) files that are unique to each user. In some scenarios, certain fields of PAC files can be specific to a group of users. For example, in a financial firm traders and salespeople can have different needs for internet usage, such that a PAC file can be specified for traders and sales people.

Typically, PAC files are generated manually by, for example, admins. Generating PAC files automatically can cause delay in implementation due to, for example, time it can take to for the admin to receive change requests and then implement the changes. Even if the admin receives the request and implements immediately upon receipt, manually creating a PAC file can take hours. In some scenarios, it can be desired for PAC file changes to be made more quickly. For example, technology teams may have a deadline to finish system changes/complete testing that can require proxy rule change, such that they will need the proxy rule to be created and deployed into PAC file as soon as possible to buy tech team more time for their testing.

Another difficulty in PAC file creating/updates can involve ensuring that the PAC files are properly validated prior to deployment. Currently, this process can take hours and/or days to generate and/or validate PAC files. Therefore, it can be desirable to automatically validate PAC files in a consistent manner on a short timeline.

SUMMARY OF THE INVENTION

Advantages of the invention can include an end-to-end solution for creating and deploying PAC files, ease of creating/validating PAC files through an intuitive user interface, shortened time to create/deploy PAC files, and consistent, accurate and reproducible creation/modification of the PAC files. Advantages of the invention can also include allowing more PAC file requests with less server capacity. Advantages of the invention can also include avoiding down time due to, for example, allowing parallel creation/modification of PAC files.

In one aspect, the invention includes a system for automatically creating, updating and validating proxy autoconfiguration (PAC) files. The system includes a PAC management application configured to perform receive, via a graphical user interface (GUI), requests to create or modify a PAC file, wherein the requests include a PAC template selection from a plurality of available PAC templates. The PAC management application can also be configured to transmit the selected PAC template to the GUI, wherein the PAC template include a proxyset selection field. The PAC management application can also be configured to receive via the GUI a proxyset value as entered into the proxyset selection field, wherein the proxyset value is one or more specific proxysets of a plurality of available proxysets. The PAC management application can also be configured to determine one or more rules associated with each of the one or more specific proxysets. The PAC management application can also be configured to determine a PAC file based on the one or more rules and the one or more specific proxysets. The PAC management application can also be configured to validate the determined PAC file. The PAC management application can also be configured to if the validation passes, deploy the PAC file, otherwise do not deploy the PAC file and transmit a failure indicate through the GUI. The system can also include a PAC offering application to serve PAC files to requesting computing devices. The system can also include a database to store PAC templates, rules and proxysets.

In some embodiments, the plurality of available PAC templates is based on a matching rule that specifies for each user available PAC templates. In some embodiments, wherein the PAC management application is further configured to create one or more new PAC file templates, create one or more new rules, create one or more new proxysets or any combination thereof.

In some embodiments, creating one or more new rules further comprises for each newly created rule receiving via the GUI a ruleset name, ruleset type, an entity for the rule, an operator for the rule, a value for the rule, a user that the rule can apply to, or any combination thereof.

In some embodiments, creating one or more new proxysets further comprises for each newly created proxyset receiving one or more rules to associate with the proxyset, a proxy host name, or any combination thereof.

In some embodiments, creating one or more new PAC file templates further comprises for each template one or more proxysets, a default proxyset, or any combination thereof. In some embodiments, the PAC management application is further configured to archive validated PAC files.

In some embodiments, the database further stores PAC file deployment requests, archived PAC files, and matching rules. In some embodiments, the PAC management application is further configured to receive requests for deployment of PAC files.

In another aspect, the invention involves a method for automatically creating, updating and validating proxy autoconfiguration (PAC) files. The method can involve receiving, by a processor, via a graphical user interface (GUI), requests to create or modify a PAC file, wherein the requests include a PAC template selection from a plurality of available PAC templates. The method can also involve transmitting, by the processor, the selected PAC template to the GUI, wherein the PAC template include a proxyset selection field. The method can also involve receiving, by the processor, via the GUI a proxyset value as entered into the proxyset selection field, wherein the proxyset value is one or more specific proxysets of a plurality of available proxysets. The method can also involve determining, by the processor, one or more rules associated with each of the one or more specific proxysets. The method can also involve determining, by the processor, a PAC file based on the one or more rules and the one or more specific proxysets. The method can also involve validating, by the processor, the determined PAC file. The method can also involve if the validation passes, deploying, by the processor, the PAC file, otherwise do not deploy the PAC file and transmit a failure indicate through the GUI. The method can also involve serving, by the processor, PAC files to requesting computing devices. The method can also involve storing, by the processor, in a database the PAC files, the PAC templates, PAC rules and PAC proxysets.

In some embodiments, the plurality of available PAC templates is based on a matching rule that specifies for each user available PAC templates. In some embodiments, the method further comprises creating one or more new PAC file templates, creating one or more new rules, creating one or more new proxysets or any combination thereof.

In some embodiments, creating one or more new rules further comprises for each newly created rule receiving via the GUI a ruleset name, ruleset type, an entity for the rule, an operator for the rule, a value for the rule, a user that the rule can apply to, or any combination thereof.

In some embodiments, creating one or more new proxysets further comprises for each newly created proxyset receiving one or more rules to associate with the proxyset, a proxy host name, or any combination thereof. In some embodiments, creating one or more new PAC file templates further comprises for each template one or more proxysets, a default proxyset, or any combination thereof.

In some embodiments, the method further comprises archiving validated PAC files. In some embodiments, the method further comprises storing PAC file deployment requests, archived PAC files, and matching rules.

In some embodiments, the method further comprises receiving requests for deployment of PAC files.

These, additional, and/or other aspects and/or advantages of the present invention may be set forth in the detailed description which follows; possibly inferable from the detailed description; and/or learnable by practice of the present invention.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 4 is a GUI displaying fields for creating a PAC template, according to some embodiments of the invention.

FIG. 7 is a GUI of a template for creating a proxyset, according to some embodiments of the invention.

FIG. 10 is a GUI displaying a template for creating new rules, according to some embodiments of the invention.

FIG. 11 is a GUI of a particular selected rule template, according to some embodiments of the invention.

FIG. 12 shows a GUI showing changes, according to some embodiments of the invention.

FIGS. 15A and 15B are diagrams of a matching rule, with corresponding proxysets and/or rulesets, according to some embodiments of the invention.

FIG. 16 shows a diagram of a template, tmpl_1 of FIGS. 15A and 15B, with its corresponding proxysets and rulesets, according to some embodiments of the invention.

FIG. 17 is a diagram of a PAC file created using tmpl_1 of FIG. 16, according to some embodiments of the invention.

Figure 1:
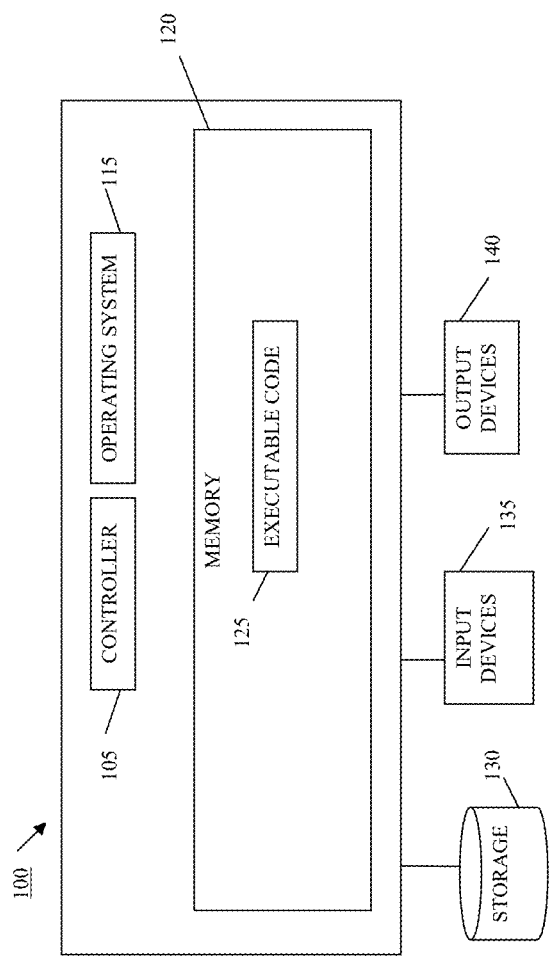
FIG. 1 shows a block diagram of an exemplary computing device which may be used with embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Before at least one embodiment of the invention is explained in detail, it is to be understood that the invention is not limited in its application to the details of construction and the arrangement of the components set forth in the following description or illustrated in the drawings. The invention is applicable to other embodiments that may be practiced or carried out in various ways as well as to combinations of the disclosed embodiments. Also, it is to be understood that the phraseology and terminology employed herein is for the purpose of description and should not be regarded as limiting.

Unless specifically stated otherwise, as apparent from the following discussions, it is appreciated that throughout the specification discussions utilizing terms such as "processing", "computing", "calculating", "determining", "enhancing" or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices. Any of the disclosed modules or units may be at least partially implemented by a computer processor.

As used herein, "machine learning", "machine learning algorithms", "machine learning models", "ML", or similar, may refer to models built by algorithms in response to/based on input sample or training data. ML models may make predictions or decisions without being explicitly programmed to do so. ML models require training/learning based on the input data, which may take various forms.

ML models may, for example, include Large Language Models (LLM) such as Generative Pre-Trained Transformer (GPT), Bidirectional Encoder Representations from Transformers (BERT), Pathways Language Model (PaLM) and the like, (artificial) neural networks (NN), decision trees, regression analysis, Bayesian networks, Gaussian networks, genetic processes, etc. Additionally, or alternatively, ensemble learning methods may be used which may use multiple/modified learning algorithms, for example, to enhance performance. Ensemble methods, may, for example, include "Random forest" methods or "XGBoost" methods.

Neural networks (NN) (or connectionist systems) are computing systems inspired by biological computing systems but operating using manufactured digital computing technology. NNs are made up of computing units typically called neurons (which are artificial neurons or nodes, as opposed to biological neurons) communicating with each other via connections, links or edges. In common NN implementations, the signal at the link between artificial neurons or nodes can be for example a real number, and the output of each neuron or node can be computed by function of the (typically weighted) sum of its inputs, such as a rectified linear unit (ReLU) function. NN links or edges typically have a weight that adjusts as learning proceeds. The weight increases or decreases the strength of the signal at a connection. Typically, NN neurons or nodes are divided or arranged into layers, where different layers can perform different kinds of transformations on their inputs and can have different patterns of connections with other layers. NN systems can learn to perform tasks by considering example input data, generally without being programmed with any task-specific rules, being presented with the correct output for the data, and self-correcting, or learning.

Various types of NNs exist. For example, a convolutional neural network (CNN) can be a deep, feed-forward network, which includes one or more convolutional layers, fully connected layers, and/or pooling layers. CNNs are particularly useful for visual applications. Other NNs can include for example transformer NNs, useful for speech or natural language applications, and long short-term memory (LSTM) networks.

Typical NNs can require that nodes of one layer depend on the output of a previous layer as their inputs. Current systems typically proceed in a synchronous manner, first typically executing all (or substantially all) of the outputs of a prior layer to feed the outputs as inputs to the next layer. Each layer can be executed on a set of cores synchronously (or substantially synchronously), which can require a large amount of computational power, on the order of 10 s or even 100 s of Teraflops, or a large set of cores. On modern GPUs this can be done using 4,000-5,000 cores.

It will be understood that any subsequent reference to "machine learning", "machine learning algorithms", "machine learning models", "ML", or similar, may refer to any/all of the above ML examples, as well as any other ML models and methods as may be considered appropriate.

FIG. 1 shows a high-level block diagram of an exemplary computing device which may be used with embodiments of the present invention. Computing device 100 may include a controller or processor 105 that may be, for example, a central processing unit processor (CPU), a chip or any suitable computing or computational device, an operating system 115, a memory 120, a storage 130, input devices 135 and output devices 140 such as a computer display or monitor displaying for example a computer desktop system. Each of modules, methods and equipment and other devices and modules discussed herein, may be or include, or may be executed by, a computing device such as included in FIG. 1 although various units among these modules may be combined into one computing device.

Operating system 115 may be or may include any code segment designed and/or configured to perform tasks involving coordination, scheduling, arbitration, supervising, controlling or otherwise managing operation of computing device 100, for example, scheduling execution of programs. Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 120 may be or may include a plurality of possibly different memory units. Memory 120 may store for example, instructions (e.g., code 125) to carry out a method as disclosed herein, and/or data.

Executable code 125 may be any executable code, e.g., an application, a program, a process, task or script. Executable code 125 may be executed by controller 105 possibly under control of operating system 115. For example, executable code 125 may be one or more applications performing methods as disclosed herein, for example those of FIG. 2 or other figures, or other methods, according to embodiments of the present invention. In some embodiments, more than one computing device 100 or components of device 100 may be used for multiple functions described herein. For the various modules and functions described herein, one or more computing devices 100 or components of computing device 100 may be used. Devices that include components similar or different to those included in computing device 100 may be used, and may be connected to a network and used as a system. One or more processor(s) 105 may be configured to carry out embodiments of the present invention by, for example, executing software or code. Storage 130 may be or may include, for example, a hard disk drive, a floppy disk drive, a Compact Disk (CD) drive, a CD-Recordable (CD-R) drive, a universal serial bus (USB) device or other suitable removable and/or fixed storage unit. Data may be stored in a storage 130 and may be loaded from storage 130 into a memory 120 where it may be processed by controller 105. In some embodiments, some of the components shown in FIG. 1 may be omitted.

Input devices 135 may be or may include a mouse, a keyboard, a touch screen or pad or any suitable input device. It will be recognized that any suitable number of input devices may be operatively connected to computing device 100 as shown by block 135. Output devices 140 may include one or more displays, speakers and/or any other suitable output devices. It will be recognized that any suitable number of output devices may be operatively connected to computing device 100 as shown by block 140. Any applicable input/output (I/O) devices may be connected to computing device 100, for example, a wired or wireless network interface card (NIC), a modem, printer or facsimile machine, a universal serial bus (USB) device or external hard drive may be included in input devices 135 and/or output devices 140.

Embodiments of the invention may include one or more article(s) (e.g. memory 120 or storage 130) such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein.

Figure 2:
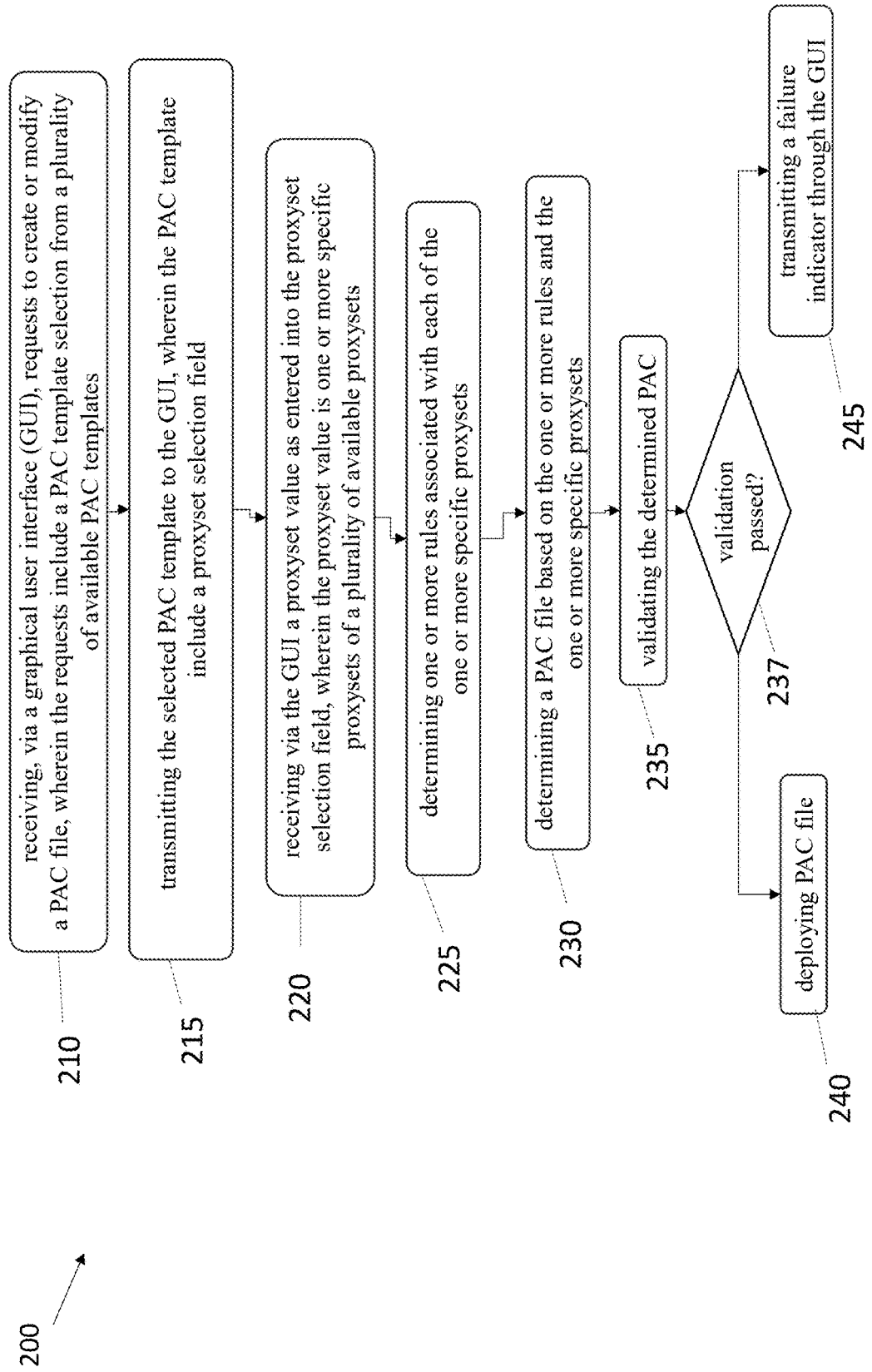
FIG. 2 is flowchart for automatically creating, updating, and validating proxy autoconfiguration (PAC) file, according to some embodiments of the invention.

FIG. 2 is flowchart for a method 200 for automatically creating, updating, and validating proxy autoconfiguration (PAC) file (e.g., via a computing system), according to some embodiments of the invention.

The method can involve receiving, via a graphical user interface (GUI), requests to create or modify a PAC file, wherein the requests include a PAC template selection from a plurality of available PAC templates (Step 210).

Figure 3:
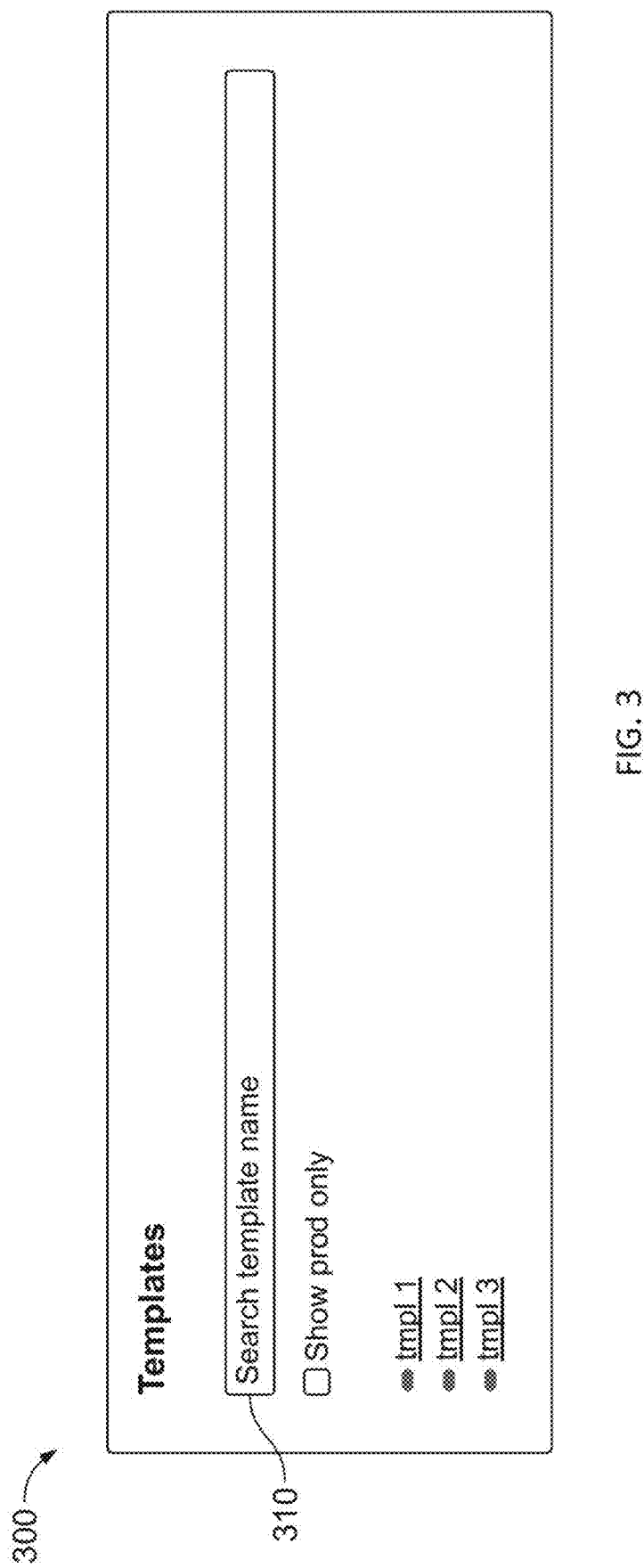
FIG. 3 is a GUI displaying a plurality of available PAC templates for a user to select templates, according to some embodiments of the invention.

Turning to FIG. 3, FIG. 3 is an example of a GUI 300 displaying a plurality of available PAC templates for a user to select, tmpl_1, tmpl_2, and tmpl_3, according to some embodiments of the invention. Input field 310 shows a search window for other templates that may exist in the system. The templates can be stored in database, as is described in further detail below with respect to FIG. 13.

The plurality of PAC templates can be created through a GUI, for example, as shown in FIG. 4. FIG. 4 is a GUI 400 displaying fields for creating a PAC template, according to some embodiments of the invention. The GUI 400 can include a template name field 410 so that a name for the template can be defined, a default proxyset field 415 so that if there is no match among the proxysets, the default proxyset field can be used. The GUI 400 can include a proxyset field 420 to input one or more proxysets available for the template, a notes field 425, a ticket info field 430, for example, to input an identifier associated with the PAC file creation, and a purpose of creation field 435. In various embodiments, more or less of these fields are present in the GUI.

Figure 5:
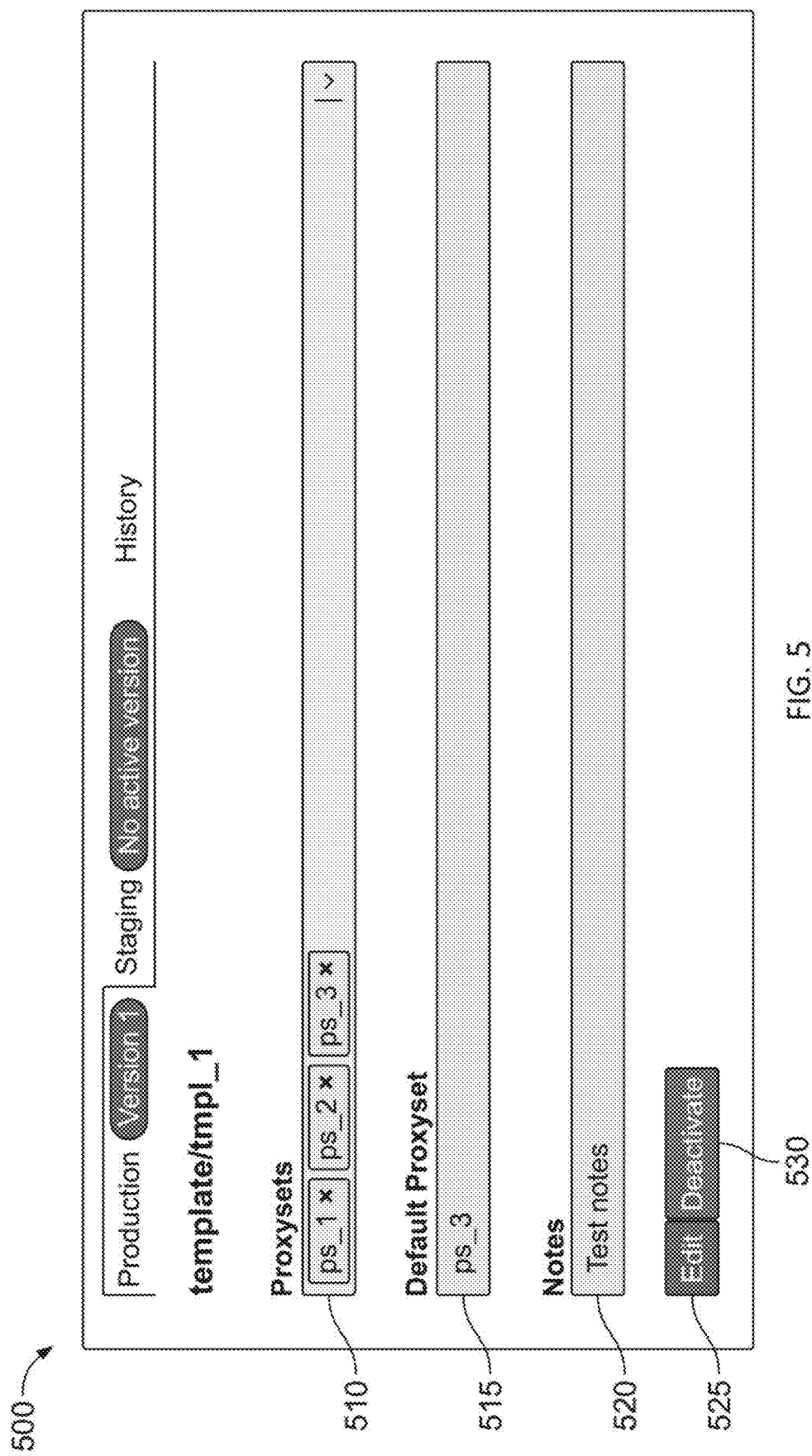
FIG. 5 is a GUI displaying a particular selected PAC template, according to some embodiments of the invention.

Turning back to FIG. 2, the method can involve transmitting the selected PAC template to the GUI, wherein the PAC template includes a proxyset selection field (Step 215). Turning to FIG. 5, FIG. 5 is a GUI 500 displaying a particular selected PAC template (e.g., temp_1 of FIG. 3), according to some embodiments of the invention. The proxyset field 510 can display all available proxysets for the template (e.g., as can be input as shown in FIG. 4). In FIG. 5, proxysets ps_1, ps_2, and ps_3 are auto populated in the proxyset field 510. The default proxyset field 515 shows the default proxyset of ps_3 as being the default. The default proxyset is part of the template. The notes field 520 can allow for entry of any notes associated with the selected PAC template to be recorded. The edit button 525 can allow changing the proxysets. The deactivate button 530 can allow the template to be removed.

In various embodiments, the proxyset field 510 is a drop-down menu, is presented as a list with checkbox, and/or is any field as is known in the art that can allow for selection of one more or items among a plurality of items. Table 1 is an example of a data format for a PAC file template, according to some embodiments of the invention.

TABLE 1

| | templates |
|---|---|
| PK | id ObjectId NOT NULL | id: String
key: String
response_template: String
staging: Int32
prod: Int32
versions: Array <

TABLE 1-continued

| | templates |
|---|---|
| PK | id ObjectId NOT NULL |

{
    proxy_sets: Array<String>
    default_proxy_set: String
}
>
history: {
    actions: Array<Action>
    last_modified: String
}
notes: String Templates can store templates used for generation of PAC files; id can be a numerical id of template; key can be string identifier of template; response_template can be a name of template; staging can be 1 if staged for review, 0 otherwise; prod can be 1 if deployed to production, 0 otherwise indicates latest production version number and that the template has been deactivated and not in production; versions can be a record of past versions of template deployed to production. Each version can store a list of proxysets associated with the template and the default proxyset history can be history of actions (create, modify and/or deactivate) which can include the date of action, comment, and/or username, and/or stores the last modified timestamp of template; and notes can be extra information relevant to template (e.g., if entered).

The data fields in Table 1 can be populated with at least some of the data as input in FIGS. 4 and 5. Table 2 shows an example of data values format for the PAC file template as shown above in Table 1.

TABLE 2

_id: ObjectId('6704113f735697413525201c')
id: "t1"
key: "template/tmpl_1"
type: "template"
respone_template: "tmpl_1"
staging: 0
prod: 1
• versions: Array
  • 0: Object
  • 1: Object
    • proxy_sets: Array
      0: "ps_1"
      1: "ps_2"
      2: "ps_3"
      default_proxy_set: "ps_3"
• history: Object
  • actions: Array
    • 0: Object
    • 1: Object
    • 2: Object
    • 3: Object
      comment: "promoting version 1"
      date: "2016-07-21T02:09:48"
      action: "promote"
      username: "user_1"
      last_modified: "2016-07-21T02:09:48"
  notes: "Test notes"

Turning back to FIG. 2, the method can involve receiving via the GUI a proxyset value as entered into the proxyset selection field, wherein the proxyset value is one or more specific proxysets of a plurality of available proxysets (Step 220). Turning back to FIG. 5, all of a subset of the proxysets can be deleted from the proxyset field 510, causing deleted proxysets to be removed from the selected PAC template, and remaining proxysets to be the proxyset value.

Figure 6:
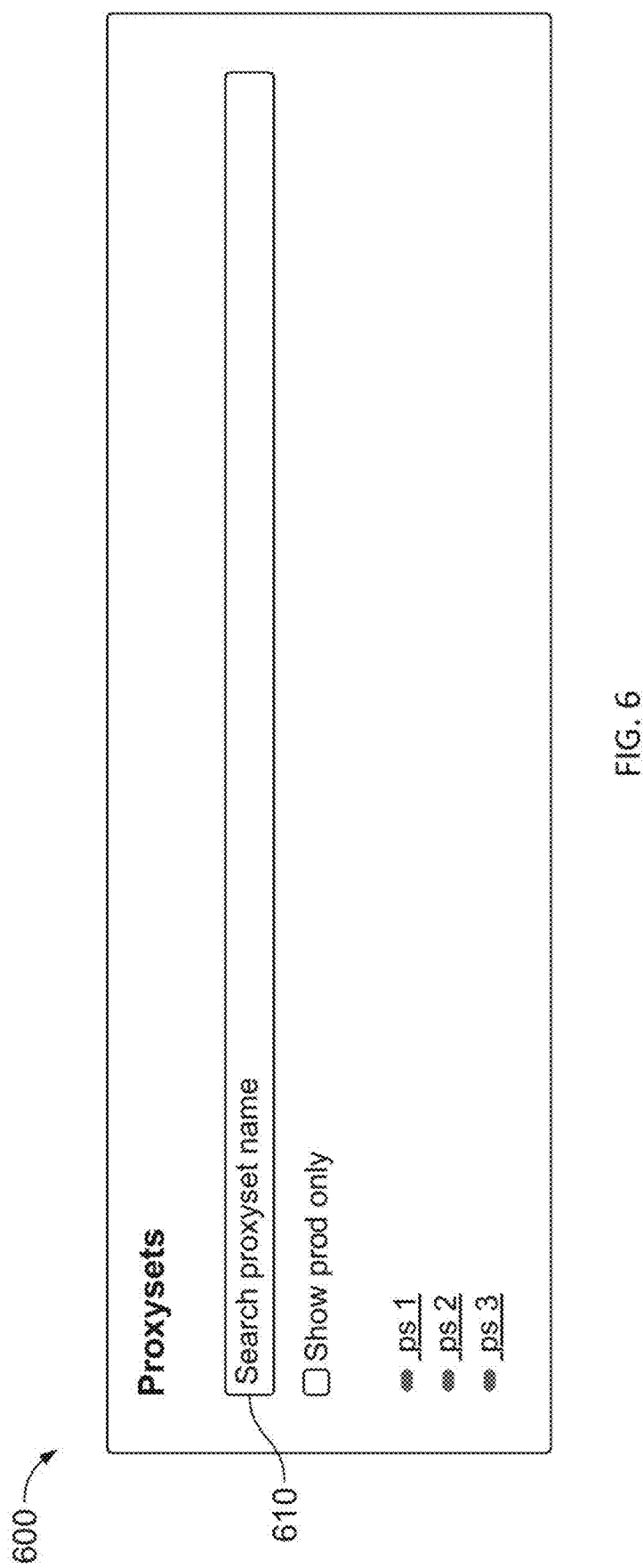
FIG. 6 is a GUI displaying a plurality of available proxysets, according to some embodiments of the invention.

Turning to FIG. 6, FIG. 6 is a GUI 600 displaying a plurality of available proxysets, according to some embodiments of the invention. Input field 610 shows a search window for other proxysets that may exist in the system. The proxysets can be stored in database, as is described in further detail below with respect to FIG. 13.

Turning to FIG. 7, FIG. 7 is a GUI 700 of a template for creating a proxyset, according to some embodiments of the invention. The proxyset name field 710 can allow for input of a proxyset name (e.g., ps_1, ps_2, as described above with respect to FIG. 2). The ruleset field 715 can allow entry of one or more rulesets that are the rulesets associated with the proxyset that can be created with this template. The add new proxy button 720 can allow new proxy servers to be added to the particular proxyset template. The notes field 725 can allow for entry of a note. The ticket info field 730 can allow entry of a ticket number associated with the request for a new PAC/proxyset. The purpose of creation field 740 can allow entry of a textual description of the purpose of creation for the proxyset.

Figure 8:
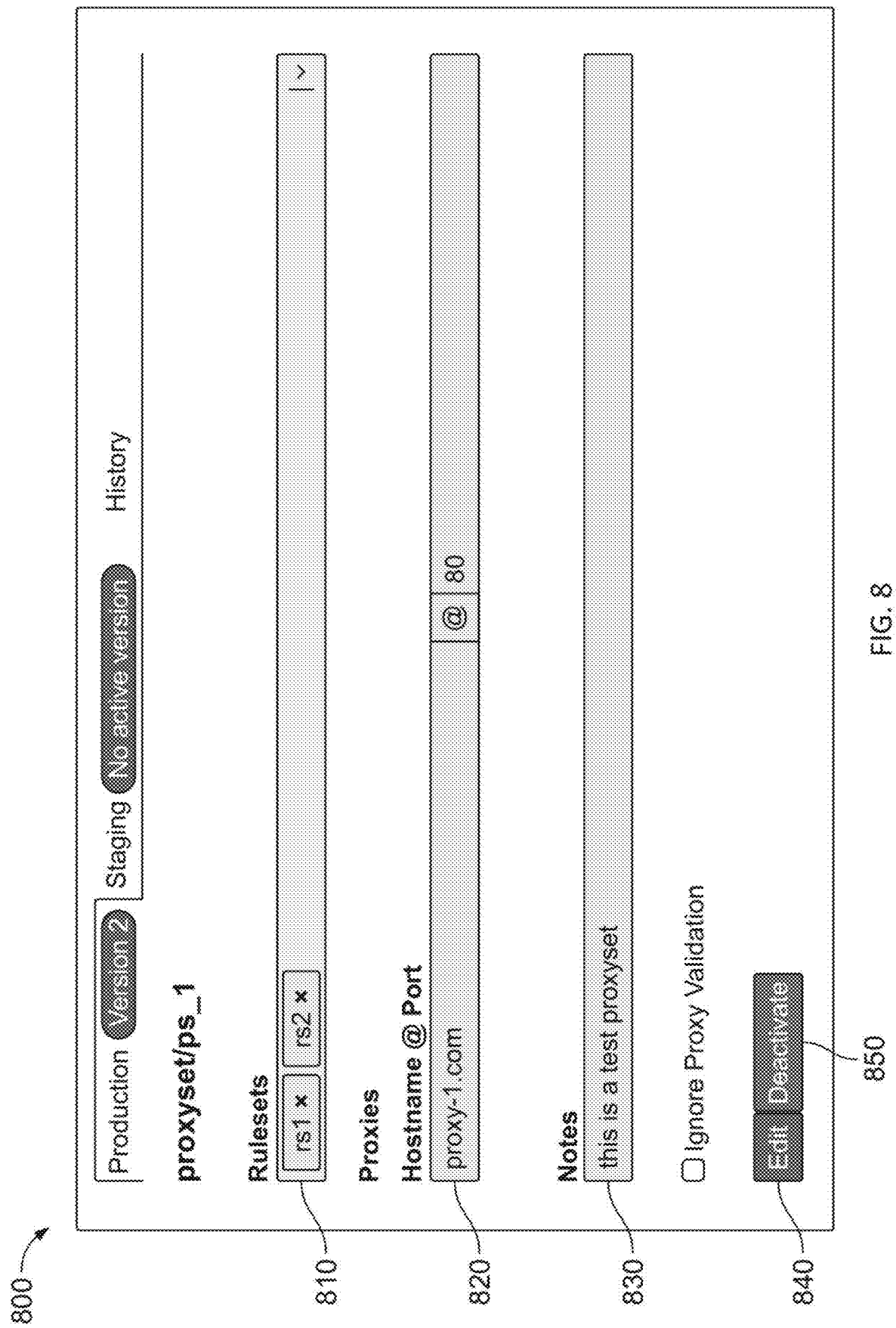
FIG. 8 shows a GUI displaying a particular selected proxyset template, according to some embodiments of the invention.

Turning to FIG. 8, FIG. 8 shows a GUI 800 displaying a particular selected proxyset template (e.g., ps_1 as described above in FIG. 6), according to some embodiments of the invention. The proxyset field 810 can display all available rules for the proxyset template (e.g., as can be input as shown in FIG. 7). In FIG. 8, rulesets rs1 and rs2 are auto populated in the ruleset field 810. The proxies field 820 allows specification of a particular proxy for the proxyset ps_1. The notes field 830 can allow for entry of any notes associated with the selected PAC template to be recorded. The edit button 840 can allow changing the rulesets. The deactivate button 850 can allow the proxyset to be removed.

Table 3 shows an example of a data format for a proxyset, according to some embodiments of the invention.

TABLE 3

| | proxysets |
|---|---|
| PK | id ObjectId NOT NULL |
| | id: String |
| | key: String |
| | proxy_set: String |
| | staging: Int32 |
| | prod: int32 |
| | versions: Array < |
| |   { |
| |     rule_sets: Array<String> |
| |     proxies: Array<{ |
| |       hostname: String |
| |       port: String |
| |     }> |
| |   } |
| | > |
| | history: { |
| |   actions: Array-Action |
| |   last_modified: String |
| | } |
| | notes: String |

Proxysets stores proxysets used for generation of PAC files; id can be a unique numerical identifier of the proxyset; key can be a string identifier that includes a name for the proxyset with an added prefix; proxy_set can be the name of proxyset, Staging can be 1 if the proxyset is changed and/or waiting for approval, 0 otherwise; prod can indicate a latest production version number or be zero (0) the PAC file is deactivated and not in production; Versions can be a record of past versions of proxyset deployed to production. The last version can be the current production version; History: can be history of actions (create, modify and/or deactivate) which can include the date of action, comment, and/or username, and can store the last modified timestamp of the proxyset.

The data fields in Table 3 can be populated with at least some of the data as input in FIGS. 7 and 8. Table 4 shows an example of data populating the proxyset data format of Table 3.

TABLE 4

_id: ObjectId('66cd9389483685e25f4663d1')
id: "p1"
key: "proxyset/ps_1"
type: "proxyset"
proxy_set: "ps_1"
staging: 0
prod: 2
• versions: Array
  • 0: Object
  • 1: Object
  • 2: Object
    • rule_sets: Array
      0: "rs1"
      1: "rs2"
    • proxies: Array
      • 0: Object
        hostname: "proxy-1.com"
        port: "80"
• history: Object
  • actions: Array
    • 0: Object
    • 1: Object
    • 2: Object
      comment: "promoting version 1"
      date: "2020-05012T29:11:01"
      action: "promote"
      username: "user_1"
  last_modified: "2020-09-17T18:08:48"
notes: "this is a test: proxyset"
ignore_validate: 0

Turning back to FIG. 2, the method can involve determining one or more rules associated with each of the one or more specific proxysets (Step 225). As described above, proxysets can have one or more rules that are assigned to each proxyset.

Each rule can specify a condition. For example, assume a rule of host equal to 100.100.0.0, a destination host can be checked that it matches to 100.100.0.0, and if it matches then the rule is satisfied.

Figure 9:
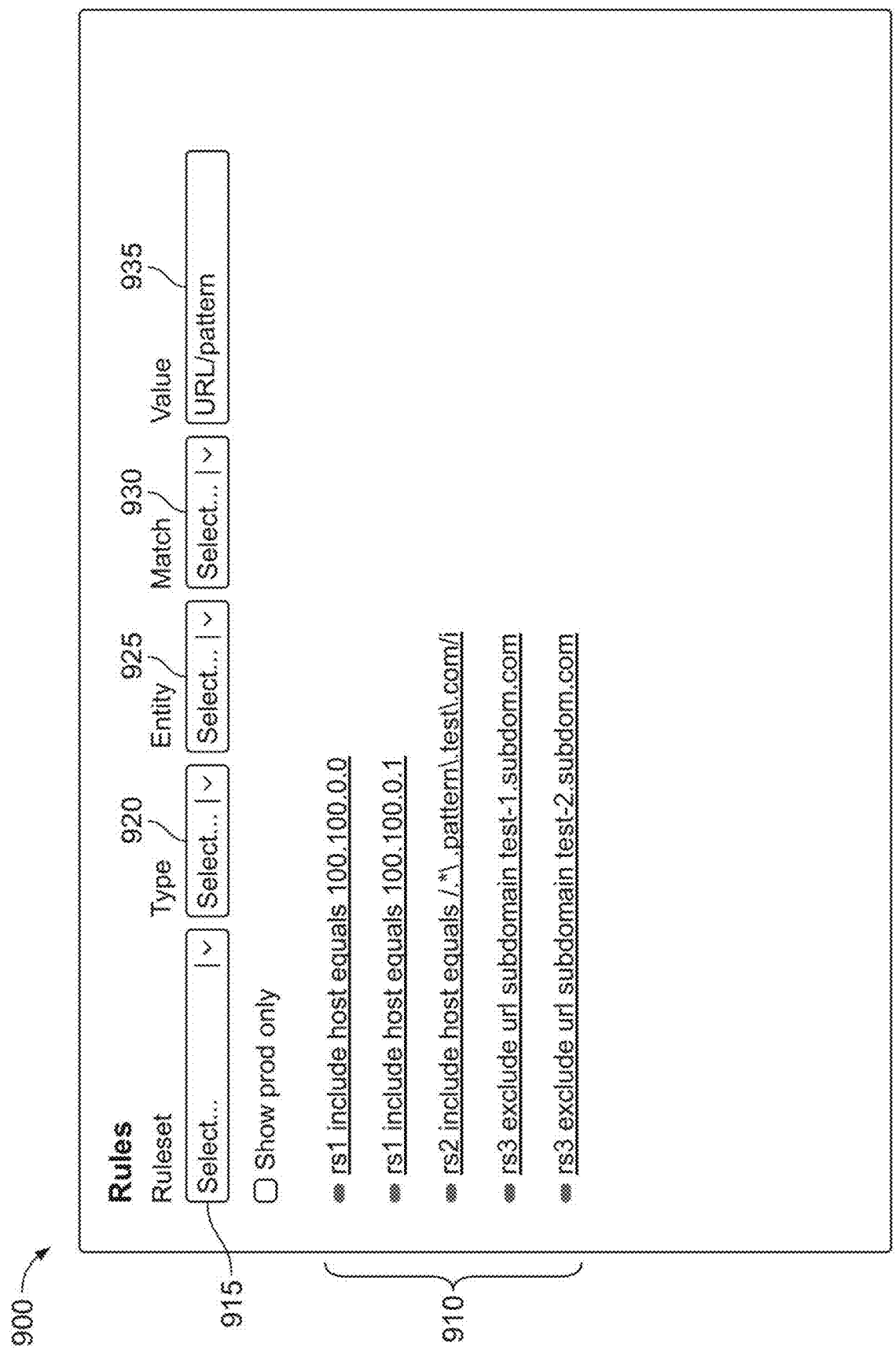
FIG. 9 is a GUI displaying a plurality of rules that are available, according to some embodiments of the invention.

Turning to FIG. 9, FIG. 9 is a GUI 900 displaying a plurality of rules 910 that are available, according to some embodiments of the invention. The fields, ruleset field 915, type field 920, match field 930 and value field 935 can allow for obtaining rules related to any of these fields.

Each rule can be created via a GUI. Turning to FIG. 10, FIG. 10 is a GUI 1000 displaying a template for creating new rules, according to some embodiments of the invention.

The ruleset name field 1010 can allow for input of a proxyset name (e.g., ps_1, ps_2, as described above with respect to FIG. 2). The ruleset field 1010 can allow for selection of an existing ruleset. If the rulesets do not include any rules as desired, then a new rule can be created. The type field 1020 can allow for a selection of available types. The types can be include or exclude. Type of include can be if request host or URL in include host list, then match the rule. For example, assume a rule of: Rs1_Include_url_equals: 'http://www.tesT.com/demo/', which checks that the "url" of a request is "equals" to 'http://www.tesT.com/demo/'. Type of exclude means if request host or URL in exclude host list, then match rule.

The entity field 1025 can allow for a selection of entity type. The entity type can be host or URL. The entity type can allow for determining if the network connect can be matched. Entity type of host can cause checking the connection of the destination host. The entity type of URL can cause checking the entire connection URL. The match field 1030 can match the connection. The match field can be equals, subdomain, or pattern. The match field of equal can involve checking if the host or URL equals the value in the rule. The match field of subdomain can involve checking only the subdomain value matches the value in the rule. The match field of pattern can involve checking a request host or URL matches with a user defined pattern. The value field 1035 can be defined check value (e.g., rule). For example, assume the define value is "www.test.com" and a connection request is sent to "www.demo.com." The type, entity and/or match fields can be used to match "www.demo.com" with "www.test.com." In another example, assume a value field Rs1_include_host_equals: www.test.com Means Your network connection "host" is "equals" to 'www.test.com' or no. If Yes (because "include"), you are matching this rule. Rs2_exclude_url_pattern: www.*.com Means Your network connection "url" is following "pattern" with "www.*.com" or no. If NO (because "exclude"). you are matching this rule.

The notes field 1040 can allow for entry of a note. The ticket info field 1050 can allow entry of a ticket number associated with the request for a new rule. The ownership field 1045 can allow for specifying a group and username associated with the group for the rule. The ticket info field 1050 can allow entry of a ticket number associated with the request for a new rule. The purpose of creation field 1055 can allow entry of a textual description of the purpose of creation for the rule.

Turning to FIG. 11, FIG. 11 is a GUI 1100 of a particular selected rule template (e.g., rs1 as described above in FIG. 9), according to some embodiments of the invention. The ruleset field 1110 can be a dropdown to display available rulesets. The type field 1120 can be a dropdown that allows for displaying available rules having the selected type. The entity field 1125 can be a drop down that allows for displaying available rules that have the selected entity type. The match field 1130 can be a dropdown that allows for displaying available rule shaving the selected match field. The value field 1135 can display the value for the rule.

The notes field 1140 can allow for entering of notes regarding the rule being created via the rule template 1100. The ownership field 1145 can display the owner's name and the user name as input as shown above in FIG. 10.

Table 5 shows an example of a data format for a ruleset, according to some embodiments of the invention.

TABLE 5

| | rules |
|---|---|
| PK | id ObjectId NOT NULL |
| | id: String |
| | key: String |
| | rule_group: String |
| | rule_set: String |
| | rule: { |
| |   entity: String |
| |   value: String |
| |   match: String |
| |   type: String |
| | } |
| | proxyset_key: String |
| | ownership: { |

TABLE 5-continued

| | rules |
|---|---|
| PK | id ObjectId NOT NULL |
| |   group: String |
| |   username: String |
| | } |
| | staging: Int32 |
| | prod: Int32 |
| | history: { |
| |   actions: Array<Action> |
| |   last_modified: String |
| | } |
| | notes: String |

Rules can store rules used for generation of PAC files; id can be a unique numerical id of rule; key can be a string identifier/name of rule; rule_group can be a rule group that each rule belongs to including a rule set, type, entity, match value in the format of ruleset_type_entity_match; rule_set can be a rule set that the current rule belongs to. Rule set can be further divided to rule groups; rule can contain information on entity, value, match and type of rule; proxyset_key can include a rule type, entity, match value in the format of ruletype_entity_match; ownership: owner of this rule (operations team); history can be history of actions (create, modify and/or deactivate) which includes the date of action, comment, and username and/or a last modified timestamp; staging can be 1 if staged for review, 0 otherwise; prod can be 1 if deployed to production, 0 otherwise; and notes can be extra information relevant to rule (if entered).

The data fields in Table 1 can be populated with at least some of the data as input in FIGS. 10 and 11. Table 6 shows an example of data populating the ruleset data format of Table 5.

TABLE 6

| |
|---|
| _id: ObjectId('67040f617356974135252016') |
| id: "r1" |
| key: "rs1_include_host_equals_100.100.0.0" |
| rule_group: "rs1_include_host_equals" |
| rule_set: "rs1" |
| · rule: Object |
|   entity: "host" |
|   value: "100.100.0.0" |
|   match: "equals" |
|   type: "include" |
|   proxyset_key: "include_host_equals" |
| · ownership: Object |
|   group: "owner_group" |
|   username: "owner_1" |
| · history: Object |
|   . actions: Array |
|     · 0: Object |
|       date: "2024-10-01T08:40:36" |
|       username: "user_1" |
|       comment: "No comment" |
|       action: "create" |
|       last_modified: "2024-10-01T08:40:36" |
| staging: 0 |
| prod: 1 |
| notes: "" |
| ignore_validate: 0 |

Turning back to FIG. 2, the method can involve determining a PAC file based on the one or more rules and the one or more specific proxysets (Step 230). The PAC file can be created by executing the template as described above with respect to FIG. 5.

Table 7 shows an example of a data format for a PAC file, according to some embodiments of the invention.

TABLE 7

| | curr_pacfiles | |
|---|---|---|
| PK | id ObjectId NOT NULL | |
| | last_modified: Date | |
| | version: String | |
| | data: String | |
| | rule: String | |
| | sha: String | |
| | validation_pass: Boolean | | curr_pacfiles can store individual PAC files to be distributed to hosts (e.g., a deployed version). Last_modified can be a date that the PAC files were last modified; Version can be a version number of a PAC file; Data can include a content of PAC file (e.g., which can be served to users); rule can be a PAC file template name; sha can be a SHA string of PAC file contents, and can be used to check if two different versions of PAC files contain the same content; and validation_pass can store result of content validation process (e.g., via Spidermonkey) e.g., by checking if the PAC file is a valid Javascript file and a valid PAC file.

Table 8 shows an example of data values for a PAC file.

TABLE 8

```
_id: ObjectId('67041af2b085c9ce2c59bbcc')
st_ctime: 1728321884
st_mtime: 1728321884
version: "2024.10.07-2"
data: "function ProxySet(args) {
           this.proxies = args.proxies;
           ..."
st_size: 4458
rule: "tmpl_1"
sha: "bdef151acd89681c81a18d9a248dc4b5791f455c1a9707d041b580a45e566582"
validation_pass: true
last_updated: 2024-10-07T17;31:29.788+00:00
```

Each PAC file can have a header/footer. The header/footer can have a data format as shown below in Table 9.

TABLE 9

| | header_footer_template | |
|---|---|---|
| PK | id ObjectId NOT NULL | |
| | header: String | |
| | footer: String | |

Header_footer_template can store header and footer information to be prepended & appended to every PAC file during generation; header can be header block as is known in the art for PAC files; and footer can be footer block as is known in the art for PAC files. Table 10 shows an example of values for the header footer:

TABLE 10

```
_id: ObjectId('64b5fd2a2031e3178ad99e4f')
header: "function ProxySet(args) {
           this.proxies = args.proxies;
           ..."
footer: "function FindProxyForURL(url, host) {
           for (var i in sets){
           ..."
```

The method can involve validating the determined PAC file (Step 235). If the validation passed (Step 237), then the method can involve deploying the PAC file (Step 240). If the validation doesn't pass (Step 237), then the method can involve transmitting a failure indicator through the GUI (Step 245).

In some embodiments, a list of administrators who have entitlements to manage and/or approve PAC files can be used to determine whether a particular user has the permission to perform the task (e.g., create/modify rulesets, create/modify proxysets and/or create/modify PAC files). Table 11 shows an example of a data format for the list of administrators:

TABLE 11

| | admin_list | |
|---|---|---|
| PK | id ObjectId NOT NULL | |
| | admin_list: Array<String> | |
| | admin_mtime: String | |
| | admin_group_name: String | |

The admin_list can be a list of usernames of admin users, admin_mtime can be a last time admin_list was modified and admin_group_name can be LDAP group name used to synchronize a list of admin_users. Table 12 shows an example of the data format of Table 1 with exemplary values:

TABLE 12

```
_id: ObjectId('66d15acddd8c0794623c3d1e')
· admin_list: Array
     0: "op_1"
     1: "op_2"
     2: "op_3"
admin_mtime: "2024-08-30 05:38:19"
admin_group_name: "admin_group"
```

In some embodiments, an archive of PAC files can be stored. Table 13 shows an example of a data format for PAC archives.

TABLE 13

| | archive_versions | | archive_pacfiles |
|---|---|---|---|
| PK | id Objectid NOT NULL | PK | id Objectid NOT NULL |
| | version. String | | last_modified. Date |
| | | | version: String |
| | | | data: String |
| | | | rule: String |
| | | | sha: String |
| | | | validation_pass: Boolean |

Archive_versions can store all version names. Archive_pacfiles can store individual PAC files of all versions including metadata and/or contents of PAC files; Last_modified can be a date that the PAC files were last modified; Version can be a version number of a PAC file; Data can include a content of PAC file (e.g., which can be served to users); rule can be a PAC file template name; sha can be a SHA string of PAC file contents, and can be used to check if two different versions of PAC files contain the same content; and validation_pass can store result of content validation process (e.g., via Spidermonkey) e.g., by checking if the PAC file is a valid Javascript file and a valid PAC file.

Table 14 is an example of data values for Archive_versions data format, and table 15 is an example of data values for archive_pacfiles:

TABLE 14

_id: Objectid('670416b1b085c9ce2c59bbbe'
version: "2024.10.07-1"

TABLE 15

_id: ObjectId('670416b1b085c9ce2c59bbbf')
st_ctime: 1728321198
st_mtime: 1728321198
version: "2024.10.07-1"
data: "function ProxySet(args) {
          this.proxies = args.proxies;
          ..."
st_size: 4458
rule: "tmpl_1"
sha: "bdef151acd89681c81a18d9a248dc4b5791f455c1a9707d041b580a45e566582"
validation pass: true In some embodiments, a deploy request can be made. Table 16 is an example of a data format for a deploy request, according to some embodiments of the invention.

TABLE 16

| | deploy_request |
|---|---|
| PK | id ObjectId NOT NULL |
| | requestor: String |
| | target_version: String |
| | request_timestamp: Date |
| | status: String |
| | execution_ts: Date |
| | op_approver: String |
| | op_app_ts: Date |
| | mgmt_approver: String |
| | mgmt_app_ts: Date |
| | ritm_id: String |
| | out_of_date_ts: Date |
| | resumed_ts: Date |

Deploy_request can store PAC file deployment request details; requestor can be a name of user requesting the deployment; target_version can be the version that is requested to be deployed; request_timestamp can be timestamp with the time that the request was made; status: can be a status of the PAC file, for example, pending, deployed, cancelled, out of date; execution_ts can be a timestamp of the time the status was updated and/or executed; op_approver can be a name indicating permission to approve the deployment; op_app_ts can be a timestamp of approval for deployment; mgmt_approver can be a name indicating permission to approve the deployment; mgmt_app_ts can be a timestamp of an approval; ritm_id: a ticket tagged to the deployment request; resumed_ts can be set when an out of date status is changed to pending.

Table 17 is an example of values for the deployment request data format.

TABLE 17

_id: ObjectId('67041893b085c9ce2c59bbc2')
target_version: "2024.10.07-1"
requestor: "op_1"
request_timestamp: 2024-10-07T17:21:23.750+00:00
status: "Deployed"
op_app_ts: 2024-10-07T17:26:20.642+00:00
op_approver: "op_2"
execution_ts: 2024-10-07T17:26:51.530+00:00
mgmt_app_ts: 2024-10-07T17:26:40.588+00:00
mgmt_approver: "op_2"
ritm_id: "ritm_test_id"

In some embodiments, PAC files that are available to particular users (e.g., created by the user or associated with the user via one or more rules), are based on a PAC matching rule. A PAC matching rule can have a data format as shown below in Table 18.

TABLE 18

| | matching_rule |
|---|---|
| PK | id ObjectId NOT NULL |
| | version: String |
| | data: String |
| | last_updated: Date |

Version can be a version number of matching rule file, data can be content of matching rule file such that PAC files are matched with the corresponding users and last_updated can be a timestamp when the matching rule file was last modified.

Table 19 is an example of data values for a PAC matching rule:

TABLE 19

_id: ObjectId('66ac7c89c6a1bfc673fd54b5')
version: "test_version"
data: "<?xml version="1.0" encoding="UTF-8"?>
    <!DOCTYPE pac-sys "rules.dtd">
    ..."
last_updated: 2024-10-07T04:00:18.699+00:00

In some embodiments, several changes to rules, proxysets, and/or templates can be displayed, e.g., for approval/ submission. For example, turning to FIG. 12, FIG. 12 shows a GUI 1200 showing changes, according to some embodiments of the invention. The GUI can provide an interface for approvers to quickly review and/or approve pending requests. Approvers can execute actions for multiple changes with one click.

In some embodiments, the matching rule data can be in a tree structure and/or destructured to a corresponding combination of predicates such that, for example, upon receiving a PAC file creation request, the templates that satisfy all of the predicates are readily available. In some embodiments, if the matching rule produces multiple results, the first file to match is returned to the user. In some embodiments, if the matching rule produces multiple results, a random file is selected.

Figure 13:
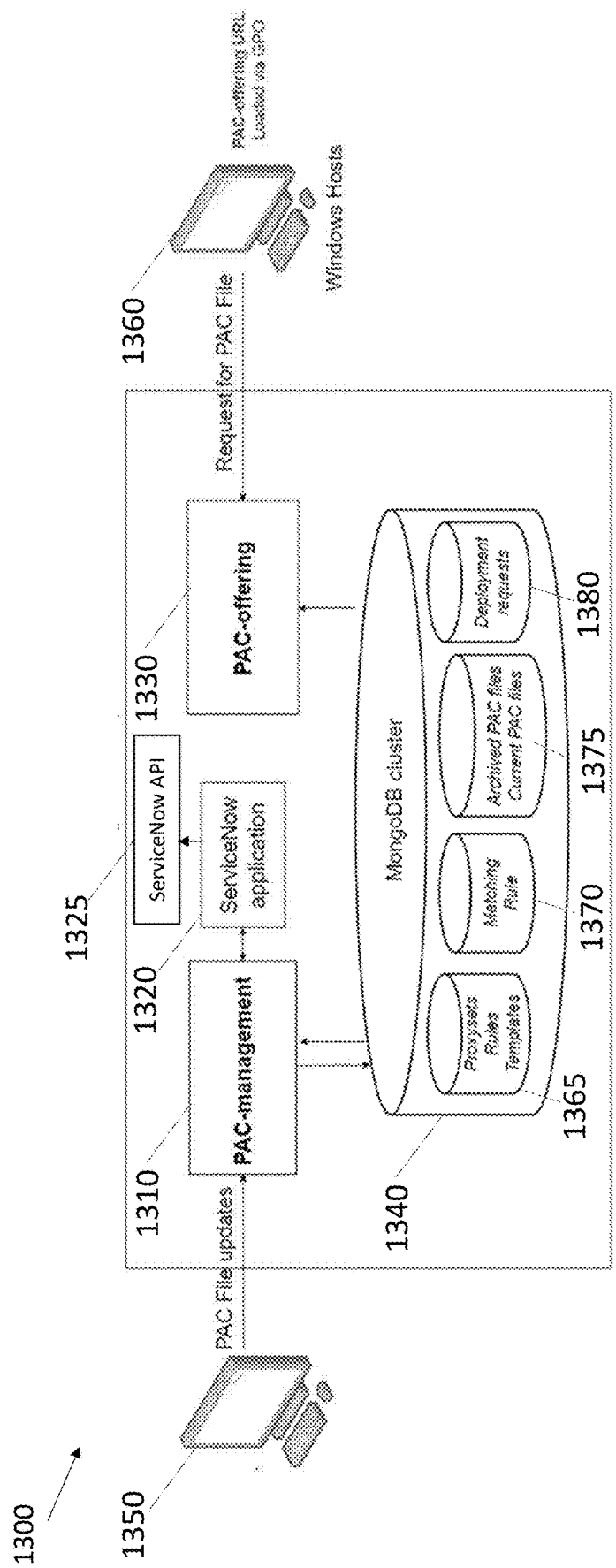
FIG. 13 is a diagram of a system architecture for automatically creating, updating, and validating proxy autoconfiguration (PAC) files, according to some embodiments of the invention.

FIG. 13 is a diagram of a system architecture 1300 for automatically creating, updating, and validating proxy auto-configuration (PAC) files, according to some embodiments of the invention. The system architecture 1300 can include a PAC management module 1310, a ServiceNow application 1320, a PAC offering module 1330, a database 1340, a plurality of computing devices 1350, 1360.

The database 1340 can be a MongoDB database. The database 1340 can be organized such that proxysets and rules templates 1365, PAC matching rules 1370, PAC files 1375 (e.g., archived and/or current), and/or deployment requests 1380 are stored. The proxysets and rules templates 1365, PAC matching rules 1370, PAC files 1375, and/or deployment requests 1380 can have data formats as described above.

The PAC management module 1310 can provide a graphical user interface (e.g., the GUIs shown above in FIGS. 3-12). The PAC management module 1310 can receive PAC template creation/updates, proxysets, rules from a user using the computing device 1350 (or another computing device communicating with the computing device) and/or communicate with the ServiceNow application 1320 and the database 1340. The ServiceNow application 1320 can communicate with the PAC management module 1310 and the database 1340 to synchronize status. In various embodiments, the ServiceNow application 1320 can be any application as is known in the art to manage changes (e.g., Jira). The PAC offering module can communicate with the database 1340 and the user 1360 requesting a PAC file. In some embodiments, the user 1360 and the user 1350 are the same.

In some embodiments, there is one computing device that interfaces with both the PAC management module 1310 and the PAC offering module 1330.

Figure 14:
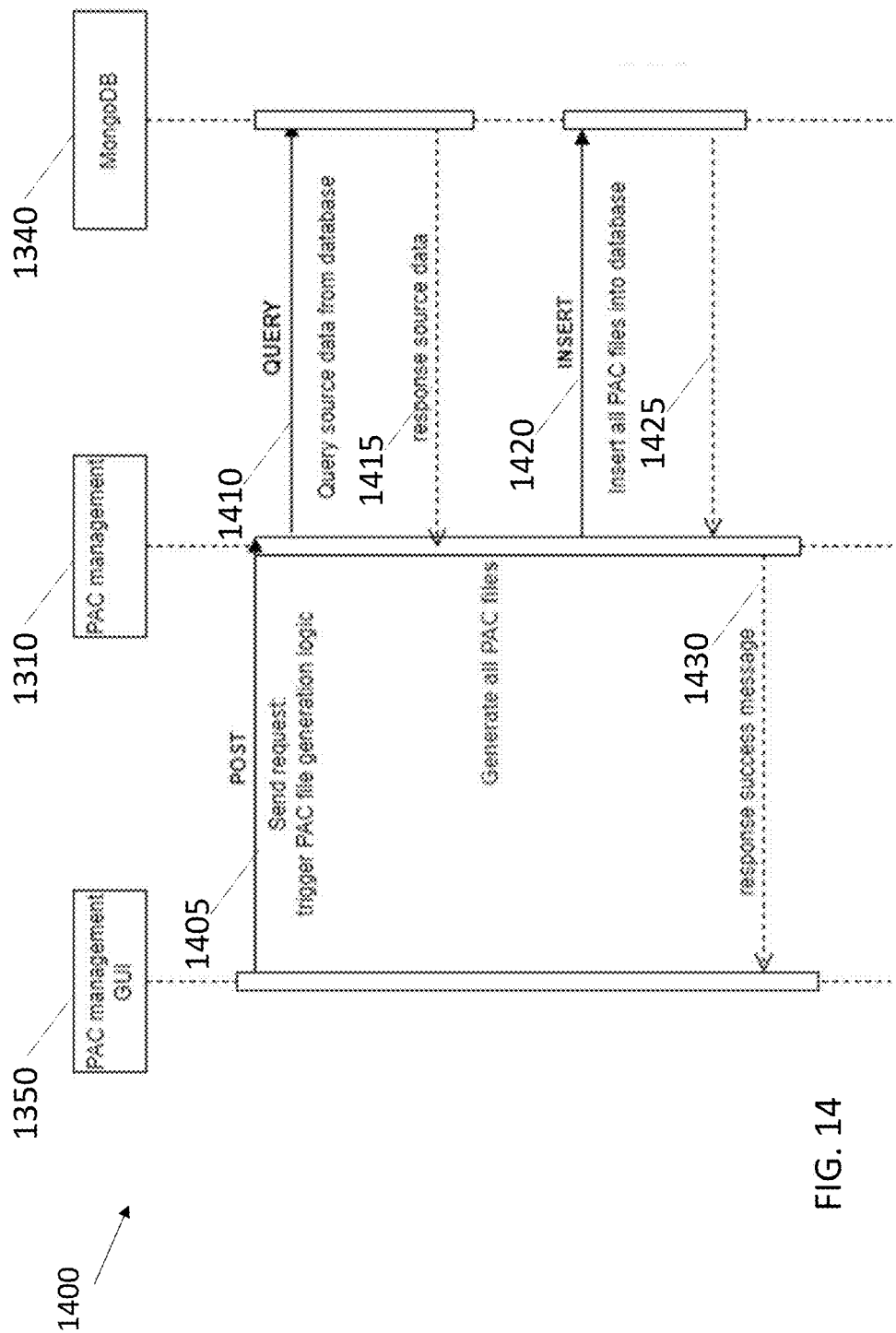
FIG. 14 is a sequence diagram for PAC file generation, according to some embodiments of the invention.

During operation, the PAC management module 1310, the database 1340 and a GUI 1350 provided by the PAC management module 1310 can be used to create PAC files. Turning to FIG. 14, FIG. 14 is a sequence diagram 1400 for PAC file generation, according to some embodiments of the invention. The GUI 1350 can transmit a request 1405 for PAC file generation to the PAC management module 1310. The request can include a user profile, rule changes, proxyset changes, or any combination thereof. The PAC management 1310 can determine a matching rule for the request. The matching rule can be an XML file. The matching rule can be determined based data associated with the request (e.g., the user belongs to a particular group or special parameters of the PAC offering URL).

The PAC management module 1310 can transmit a query 1410 to the database 1340 to retrieve all templates, corresponding proxysets and/or rulesets that correspond to the matching rule. For example, turning to FIGS. 15A and 15B, FIGS. 15A and 15B are diagrams of a matching rule, with corresponding proxysets and/or rulesets, according to some embodiments of the invention.

Assume that the PAC management module 1310 determines that the request corresponds to matching rule having data as shown in 1505. Matching rule 1505 has data that corresponds to three PAC templates, tmpl_1, tmpl_2 and tmpl_3. The corresponding data for each tmpl_1, tmpl_2 and tmpl_3 is shown in templates 1510. Tmpl_1 includes proxysets ps_1 and ps_2, tmpl_2 includes proxysets ps_2 and ps_3, tmpl_3 includes ps_1 and ps_3. The corresponding data for each proxysets ps_1, ps_2 and ps_3 is shown in proxysets 1515. Ps_1 includes rulesets rs1 and rs2, and ps_2 includes rulesets rs2 and rs3, and ps_3 includes rulesets rs1 and rs3. The corresponding data for each ruleset, rs1, rs3 and rs3, is shown in rules 1520. Each ruleset can include multiple rules. As shown, rs1 includes rule_1 and rule_2, rs2 includes rule_3, and rs2 includes rule_4 and rule_5.

Figure 15A:
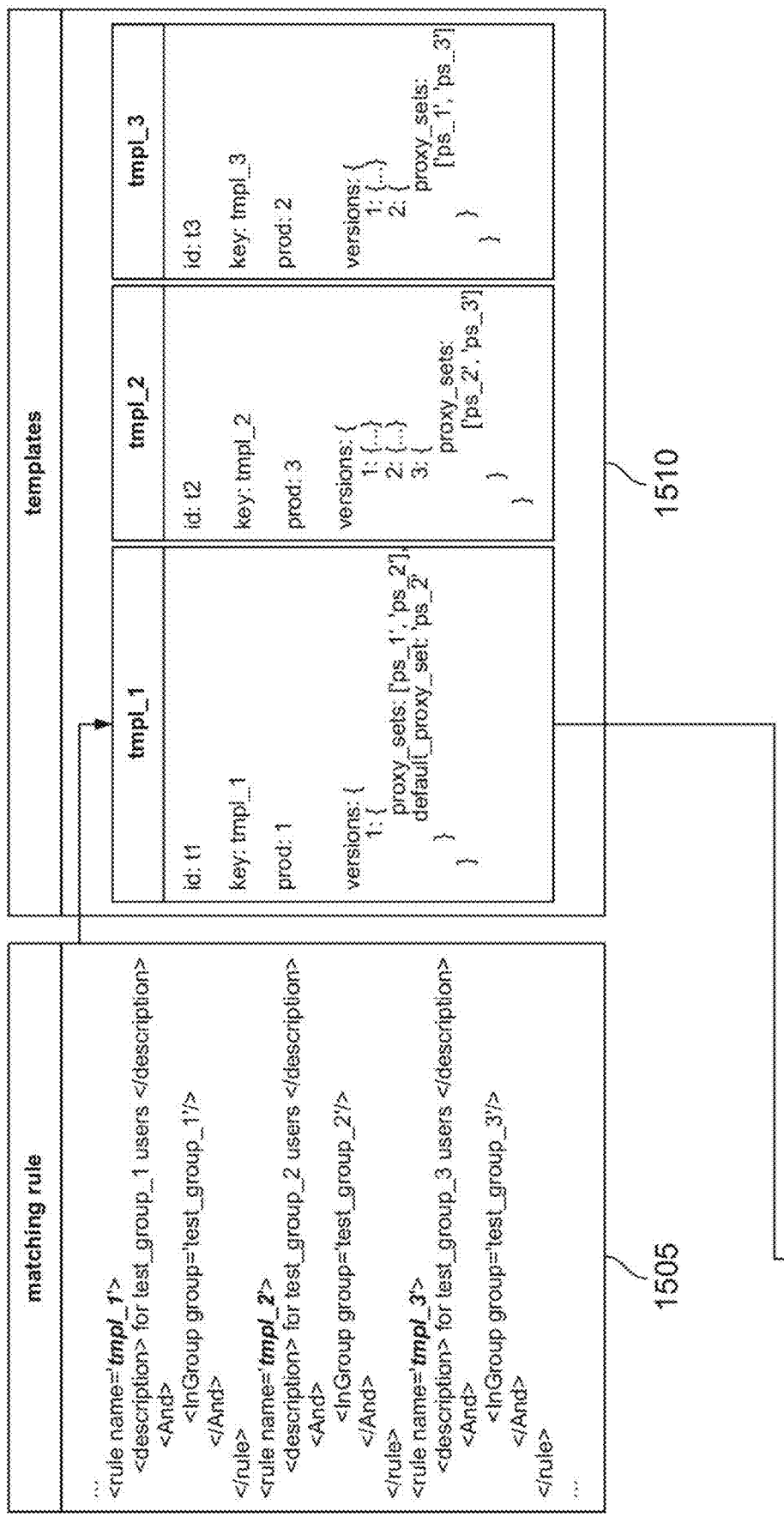
Figure 15A:
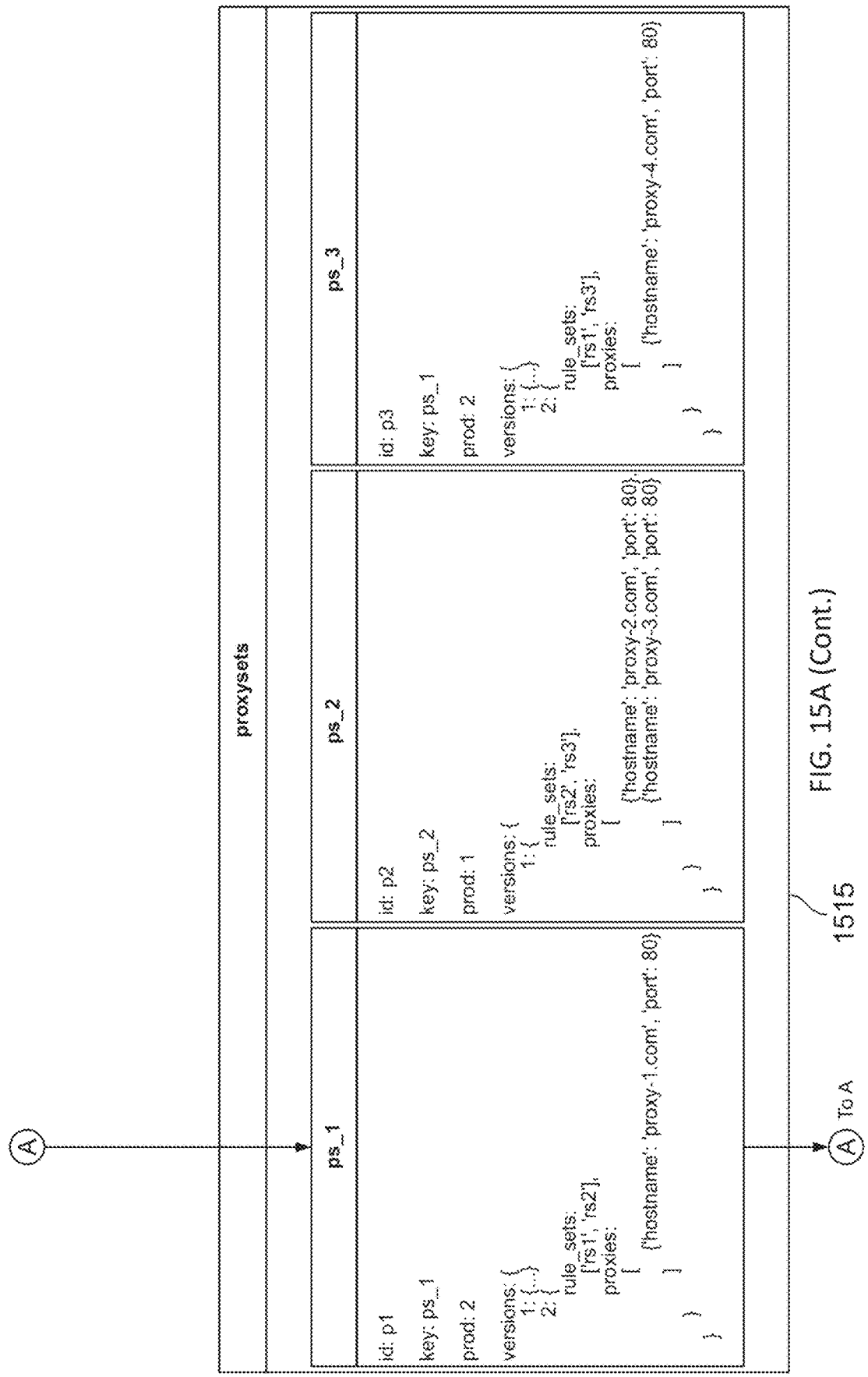

Turning back to FIG. 14, the PAC template and corresponding proxysets and rulesets (e.g., as shown in FIGS. 15A and 15B) can be transmitted back to the PAC management module 1310. The PAC management module 1310 can create the PAC file. For example, turning to FIG. 16, FIG. 16 shows a diagram of a template, tmpl_1 of FIGS. 15A and 15B, with its corresponding proxysets and rulesets, according to some embodiments of the invention. A proxyset dictionary, proxyset_dict, can be created for each proxset that belongs to tmpl_1, and a ruleset dictionary, rules_dict, can be created for each ruleset that belongs to tmpl_1. The default proxyset can be ps_2. Turning to FIG. 17, FIG. 17 is a diagram of a PAC file 1710 created using tmpl_1 of FIG. 16, according to some embodiments of the invention. The PAC management module 1310 can create the PAC file 1710 by using the information in tmpl_1. A format for the PAC file can include a header 1715 as is known in the art. The PAC file format can also include a rule group code block 1720. The rule group code block can be based on a rules dictionary 1725, rules_dict as described in FIG. 16, that is created based on the rulesets of tmpl_1. The rules_dict can be converted to a code by converting each rule in the rules_dict into a format in accordance with a particular code. For example, for a code for JavaScript, the rules_dict can be converted into the variables as shown in 1720. The PAC file format can also include a proxyset code block 1730. The proxyset code block 1730 can be based on a proxyset dictionary 1735, proxyset_dict as described above in FIG. 16, that is created based on the proxysets of tmpl_1. The proxyset_dict can be converted by converting each rule in the proxyset_dict into a format in accordance with a particular code. For example, for a code for JavaScript, the proxyset_dict can be converted into the variables as shown in 1730. The PAC file format can also include a footer 1740 as is known in the art. The PAC file format can also include a default proxyset 1745 that is based on the default proxyset for tmpl_1 1750.

As is apparent to one of ordinary skill in the art, the values of the proxy file 1710 that is created in FIG. 17, based on FIGS. 16, 15A and 15B is an example only for explanatory purposes, and that various combinations of rules, rulesets, proxysets and templates can be created.

Turning back to FIG. 14., the PAC management module 1310 can insert 1420 the PAC file (e.g., PAC file 1710) it generates into a current and/or archive section of the database 1340. The database 1340 can return a successful message 1425 to the PAC management module 1310 indicating that the newly created PAC file was successfully stored. The PAC management module 1310 can transmit a success PAC file creating/storage to the GUI 1350.

Figure 18:
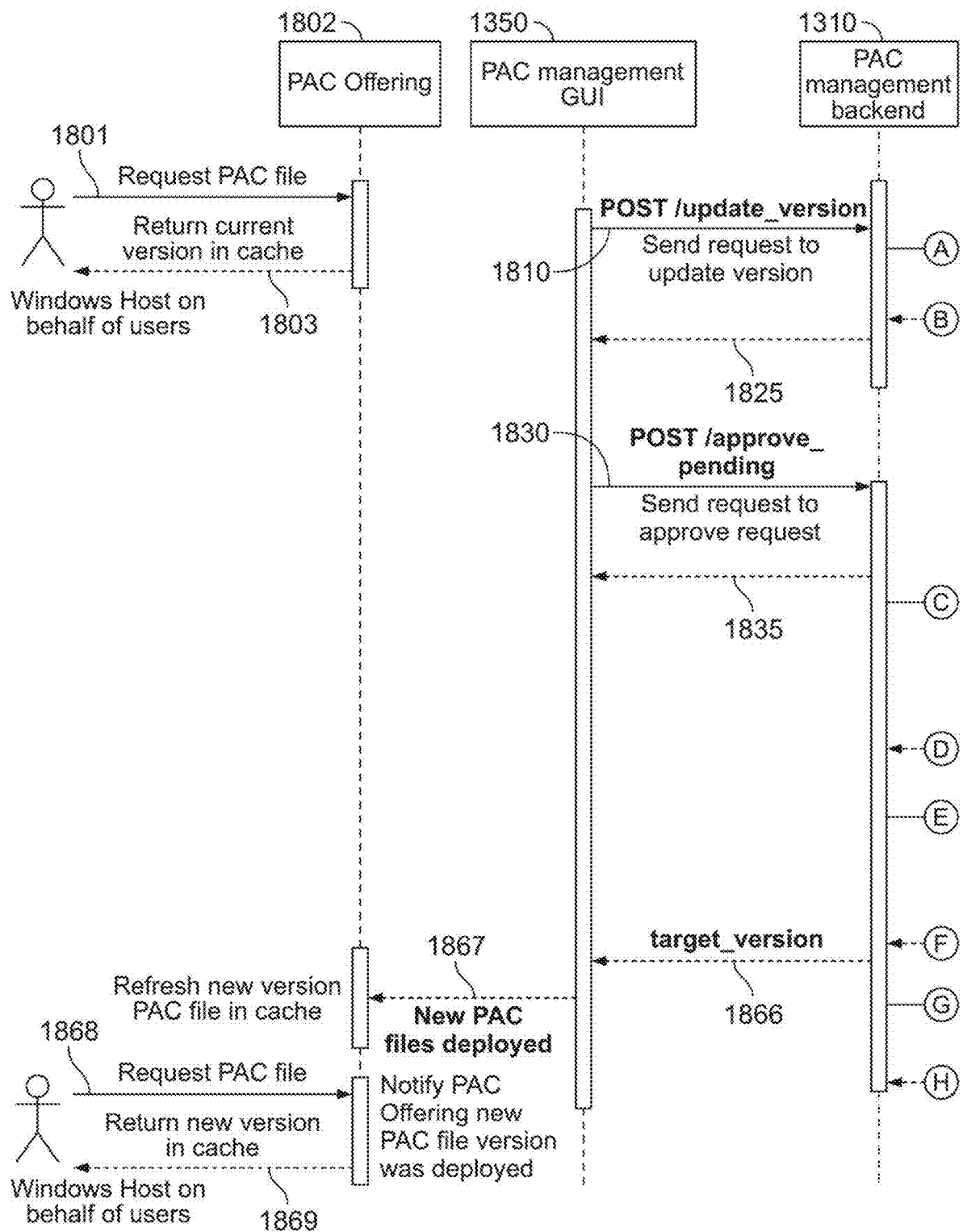
FIG. 18 is a sequence diagram shown an example of a sequence for deploying a PAC file, according to some embodiments of the invention.
Figure 18:
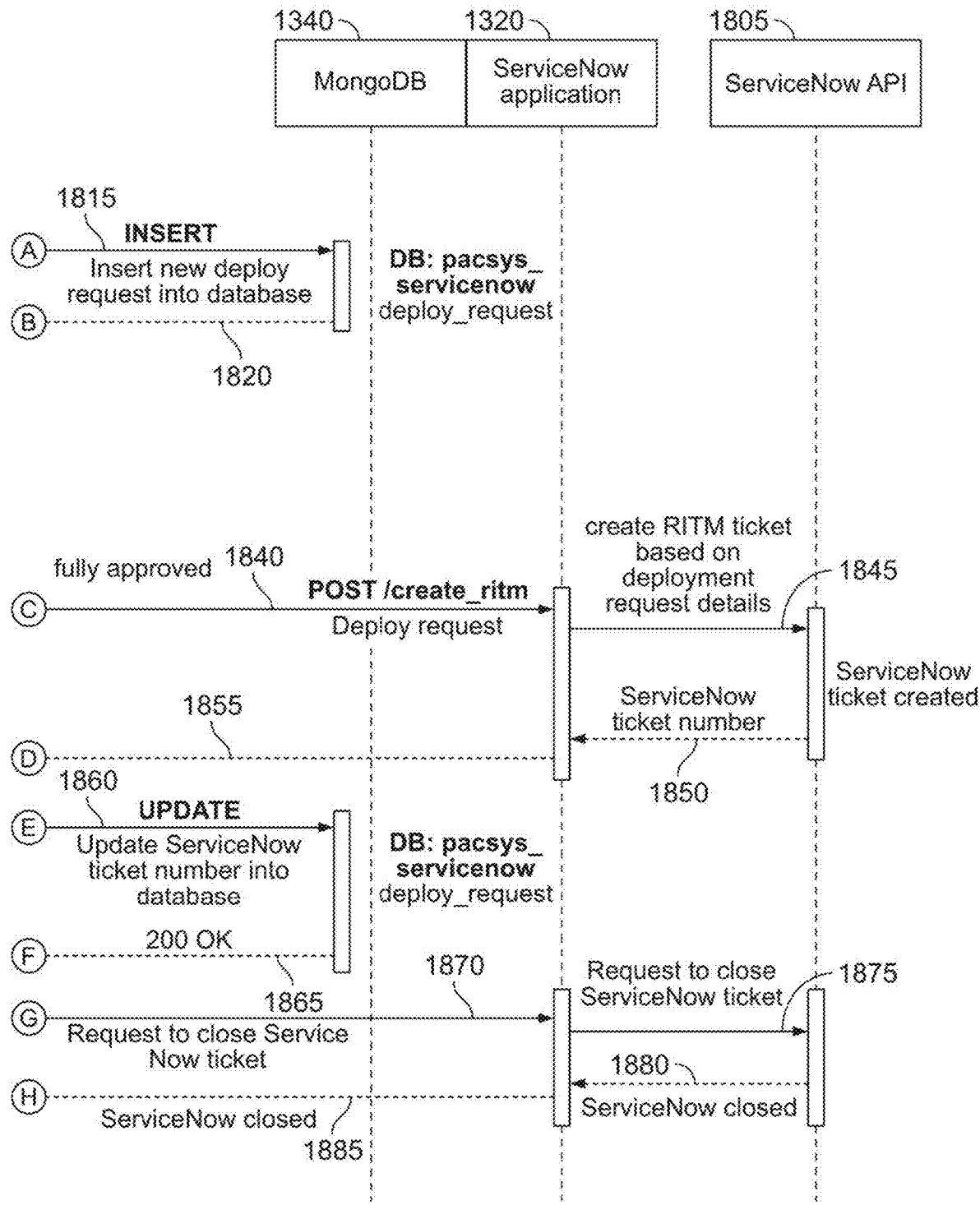

Turning back to FIG. 13, during operation, the PAC management module 1310, the database 1340, the GUI 1350 provided by the PAC management module 1310, the ServiceNow application 1320 and a ServiceNow API 1325 can deploy a newly created and/or modified PAC file. For example, turning to FIG. 18, FIG. 18 is a sequence diagram showing an example of a sequence for deploying a PAC file, according to some embodiments of the invention.

The PAC offering module 1802 can receive a request 1801 for PAC file. The PAC offering module 1802 can transmit 1803 a current version of the PAC file to the requestor.

The GUI 1350 can transmit a request 1810 to trigger creation of a request to deploy a new version of a PAC file to the PAC management module 1310. The PAC management module 1310 can create a deploy request data entry and insert 1815 into the database 1340. The database 1340 can transmit a successful reply 1820 to the PAC management module 1310. The PAC management module 1310 can transmit a successful reply 1825 to the GUI 1350. The GUI 1350 can transmit a POST request 1830 to the PAC management module 1310 to request that approval be granted for the PAC file to be deployed. The PAC management module 1310 can transmit an approval granted response 1835 back to the GUI 1350. The PAC management module 1310 can also transmit a deploy request 1840 with an indicator that it has been approved, requester information, time of the request, old version (e.g., current version being used), new version (e.g., updated version to deploy), and/or comments (e.g., by an operator at the GUI) to the ServiceNow application 1320. The ServiceNow application 1320 can transmit a request item ticket (RITM) ticket based on the deploy request 1840 details to a ServiceNow API 1805. The RITM ticket can include requestor username, requested timestamp, approver username, approval timestamp and/or deployment timestamp. The ServiceNow API 1805 can transmit 1850 a ServiceNow ticket number back to the ServiceNow application 1320. The ServiceNow application 1320 can transmit a ServiceNow ticket number 1855 back to the PAC management module 1310. The PAC management module 1310 can deploy the PAC file and transmit an update message 1860 to the database 1340 to update the database with the ServiceNow ticket. The database 1340 can transmit 1865 a success 200 ok message to the PAC management module 1310, which can then transmit the success 200 ok message 1866 to the PAC management GUI 1350. The PAC management GUI 1350 can transmit 1867 the deployed PAC file to the PAC offering module 1802. The PAC offering module 1802 can receive a request 1868 for a PAC file, and the new PAC file can be transmitted 1869 by the PAC offering module 1802.

The PAC management module 1310 can transmit a request 1870 to close the ServiceNow Ticket to the ServiceNow application 1320. The ServiceNow application 1320 can transmit the request 1875 to close the ServiceNow Ticket. The ServiceNow API 1805 can transmit a message 1880 indicating the ServiceNow ticket is closed to the ServiceNow application 1320. The ServiceNow application 1320 can transmit a message 1885 indicating the ServiceNow ticket is closed to the PAC management module 1310.

In some embodiments, a deploy request can indicate a date and time for the deployment in the future.

In various embodiments, in the case of many changes to be made at once, the PAC system files can utilize a treadmill monitor. If the treadmill monitor detects a high load (e.g., more than 80%), then more instances of a PAC-offering service can be employed and/or failing instances can be deleted immediately.

In various embodiments, the PAC files are stored in a network file system (NFS), such that if the database fails (e.g., there are connectivity issues) the PAC files can be retrieved from NFS.

In various embodiments, PAC offering module load can be balanced with a default URL (e.g., SorryURL) that can point to a default PAC file that can be used. In some embodiments, if treadmill is down, the PAC-offering servers in another platform (e.g., MKS) can be populated to serve users requests.

The aforementioned flowcharts and diagrams illustrate the architecture, functionality, and operation of possible implementations of systems, methods and computer program products according to various embodiments of the present invention. In this regard, each portion in the flowchart or portion diagrams may represent a module, segment, or portion of code, which comprises one or more executable instructions for implementing the specified logical function(s). It should also be noted that, in some alternative implementations, the functions noted in the portion may occur out of the order noted in the figures. For example, two portions shown in succession may, in fact, be executed substantially concurrently, or the portions may sometimes be executed in the reverse order, depending upon the functionality involved. It will also be noted that each portion of the portion diagrams and/or flowchart illustration, and combinations of portions in the portion diagrams and/or flowchart illustration, can be implemented by special purpose hardware-based systems that perform the specified functions or acts, or combinations of special purpose hardware and computer instructions.

As will be appreciated by one skilled in the art, aspects of the present invention may be embodied as a system or an apparatus. Accordingly, aspects of the present invention may take the form of an entirely hardware embodiment or an embodiment combining software and hardware aspects that may all generally be referred to herein as a "circuit," "module" or "system."

The aforementioned figures illustrate the architecture, functionality, and operation of possible implementations of systems and apparatus according to various embodiments of the present invention. Where referred to in the above description, an embodiment is an example or implementation of the invention. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions. It will further be recognized that the aspects of the invention described hereinabove may be combined or otherwise coexist in embodiments of the invention.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference may not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with materials equivalent or similar to those described herein.

While the invention has been described with respect to a limited number of embodiments, these should not be construed as limitations on the scope of the invention, but rather as exemplifications of some of the preferred embodiments. Other or equivalent variations, modifications, and applications are also within the scope of the invention. Accordingly, the scope of the invention should not be limited by what has thus far been described, but by the appended claims and their legal equivalents.

The invention claimed is:

1. A system for automatically creating, updating and validating proxy autoconfiguration (PAC) files, the system comprising:
   a PAC management application configured to perform:
   i) receive via a graphical user interface (GUI) requests to create or modify a PAC file, wherein the requests include a PAC template selection from a plurality of available PAC templates,
   ii) transmit the selected PAC template to the GUI, wherein the PAC template includes a proxyset selection field,
   iii) receive via the GUI a proxyset value as entered into the proxyset selection field, wherein the proxyset value is one or more specific proxysets of a plurality of available proxysets,
   iv) determine one or more rules associated with each of the one or more specific proxysets,
   v) determine a PAC file based on the one or more rules and the one or more specific proxysets,
   vi) validate the determined PAC file, and
   vii) if the validation passes, deploy the PAC file, otherwise do not deploy the PAC file and transmit a failure indicate through the GUI;
   viii) create one or more new proxysets including for each newly created proxyset receive one or more rules to associate with the proxyset and a proxy host name;
   ix) create one or more new rules via a GUI, wherein each rule includes an entity for the rule, an operator for the rule, a value for the rule, and a user that the rule can apply to; and
   a PAC offering application to serve PAC files to requesting computing devices; and
   a database to store PAC templates, rules and proxysets.

2. The system of claim 1 wherein the plurality of available PAC templates is based on a matching rule that specifies for each user available PAC templates.

3. The system of claim 1 wherein the PAC management application is further configured to create one or more new PAC file templates.

4. The system of claim 3 wherein creating one or more new rules further comprises for each newly created rule receiving via the GUI a ruleset name, ruleset type, an entity for the rule, or any combination thereof.

5. The system of claim 1 wherein the PAC management application is further configured to archive validated PAC files.

6. The system of claim 5 wherein the database further stores PAC file deployment requests, archived PAC files, and matching rules.

7. The system of claim 1 wherein the PAC management application is further configured to receive requests for deployment of PAC files.

8. A method for automatically creating, updating and validating proxy autoconfiguration (PAC) files, the method comprising:
   receiving, by a processor, via a graphical user interface (GUI), requests to create or modify a PAC file, wherein the requests include a PAC template selection from a plurality of available PAC templates;
   transmitting, by the processor, the selected PAC template to the GUI, wherein the PAC template includes a proxyset selection field;
   receiving, by the processor, via the GUI a proxyset value as entered into the proxyset selection field, wherein the proxyset value is one or more specific proxysets of a plurality of available proxysets;
   determining, by the processor, one or more rules associated with each of the one or more specific proxysets;
   determining, by the processor, a PAC file based on the one or more rules and the one or more specific proxysets;
   validating, by the processor, the determined PAC file;
   if the validation passes, deploying, by the processor, the PAC file, otherwise do not deploy the PAC file and transmit a failure indicate through the GUI;

creating one or more new proxysets including for each newly created proxyset receive one or more rules to associate with the proxyset and a proxy host name;

creating one or more new rules via a GUI, wherein each rule includes an entity for the rule, an operator for the rule, a value for the rule, and a user that the rule can apply to;

serving, by the processor, PAC files to requesting computing devices; and storing, by the processor, in a database the PAC files, the PAC templates, PAC rules and PAC proxysets.

9. The method of claim 8 wherein the plurality of available PAC templates is based on a matching rule that specifies for each user available PAC templates.

10. The method of claim 8 further comprising creating one or more new PAC file templates.

11. The method of claim 10 wherein creating one or more new rules further comprises for each newly created rule receiving via the GUI a ruleset name, ruleset type, or any combination thereof.

12. The method of claim 10 wherein creating one or more new PAC file templates further comprises for each template one or more proxysets, a default proxyset, or any combination thereof.

13. The method of claim 8 wherein the database further stores PAC file deployment requests, archived PAC files, and matching rules.

14. The method of claim 8 further comprising receiving requests for deployment of PAC files.

\* \* \* \* \*